(12) United States Patent
Barnes

(10) Patent No.: US 11,480,358 B2
(45) Date of Patent: Oct. 25, 2022

(54) MACHINE LEARNING SYSTEMS FOR MODELING AND BALANCING THE ACTIVITY OF AIR QUALITY DEVICES IN INDUSTRIAL APPLICATIONS

(71) Applicant: Synapse Wireless, Inc., Huntsville, AL (US)

(72) Inventor: Daniel Josiah Barnes, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 17/373,933

(22) Filed: Jul. 13, 2021

(65) Prior Publication Data

US 2022/0268475 A1 Aug. 25, 2022

Related U.S. Application Data

(63) Continuation of application No. 17/185,154, filed on Feb. 25, 2021, now abandoned.

(51) Int. Cl.
*F24F 11/63* (2018.01)
*G05B 13/02* (2006.01)
(Continued)

(52) U.S. Cl.
CPC .......... *F24F 11/63* (2018.01); *G05B 13/0265* (2013.01); *G05B 13/048* (2013.01); *G06N 20/10* (2019.01)

(58) Field of Classification Search
CPC ... F24F 11/63; G05B 13/0265; G05B 13/048; G06N 20/10
See application file for complete search history.

(56) References Cited

U.S. PATENT DOCUMENTS 6,874,693 B2 4/2005 Readio et al.
6,978,627 B2 12/2005 Masui et al.
(Continued)

FOREIGN PATENT DOCUMENTS

CN 109146161 A * 1/2019
CN 109856027 A * 6/2019
(Continued)

OTHER PUBLICATIONS

Wang, et al., "Towards Smart Factory for Industry 4.0: A Self-Organized Multi-Agent System with Big Data based Feedback and Coordination," Computer Networks 101, 2016, pp. 158-168.
(Continued)

*Primary Examiner* — Thomas C Lee
*Assistant Examiner* — Michael Tang
(74) *Attorney, Agent, or Firm* — Maynard Cooper & Gale, P.C.; Jon E. Holland

(57) ABSTRACT

An indoor air quality control system may be implemented to control a plurality of air handling units within an industrial facility in a concerted effort to effect an overall air quality goal. A remote server analyzes sensor data, historical data, and other environmental data (e.g., predicted weather data), and uses one or more machine learning algorithms to model the behavior of air within the facility. The sensed air quality data is considered holistically to understand the overall condition of the facility and the gradient of air flows and/or contaminant flows within the 3-dimensional space. Air handling models are applied to current sensor data to generate instructions to selectively turn on/off or otherwise control components of various air handling equipment to reach an optimized air quality result. Decisions on how to control the facility are based on environmental health and safety considerations.

26 Claims, 7 Drawing Sheets

(51) Int. Cl.
*G06N 20/10* (2019.01)
*G05B 13/04* (2006.01)

(56) References Cited

U.S. PATENT DOCUMENTS

| | | |
|---|---|---|
| 6,983,889 B2 | 1/2006 | Alles |
| 6,997,390 B2 | 2/2006 | Alles |
| 7,062,830 B2 | 6/2006 | Alles |
| 7,377,450 B2 | 5/2008 | Ostrand et al. |
| 7,434,413 B2 | 10/2008 | Wruck |
| 7,523,872 B2 | 4/2009 | Masui et al. |
| 7,632,178 B2 | 12/2009 | Meneely, Jr. |
| 7,726,582 B2 | 6/2010 | Federspiel |
| 7,797,080 B2 | 9/2010 | Durham, III |
| 7,839,275 B2 | 11/2010 | Spalink et al. |
| 7,899,579 B2 | 3/2011 | Durham, III |
| 7,908,116 B2 | 3/2011 | Steinberg et al. |
| 7,918,407 B2 | 4/2011 | Patch |
| 8,108,076 B2 | 1/2012 | Imes |
| 8,143,828 B2 | 3/2012 | Becerra et al. |
| 8,147,302 B2 | 4/2012 | Desrochers et al. |
| 8,193,929 B1 | 6/2012 | Siu et al. |
| 8,219,244 B2 | 7/2012 | Thomas et al. |
| 8,229,597 B2 | 7/2012 | Burton |
| 8,315,839 B2 | 11/2012 | Rosco et al. |
| 8,325,637 B2 | 12/2012 | Salsbury |
| 8,326,465 B2 | 12/2012 | Rosca et al. |
| 8,335,593 B2 | 12/2012 | Johnson et al. |
| 8,374,725 B1 | 2/2013 | Ols |
| 8,386,661 B2 | 2/2013 | Ostrousky |
| 8,504,174 B2 | 8/2013 | Rahme et al. |
| 8,515,584 B2 | 8/2013 | Miller et al. |
| 8,550,370 B2 | 10/2013 | Barrett et al. |
| 8,651,391 B2 | 2/2014 | Patch |
| 8,705,423 B2 | 4/2014 | Salsbury et al. |
| 8,718,707 B2 | 5/2014 | Crawford et al. |
| 8,738,327 B2 | 5/2014 | Steinburg et al. |
| 8,876,940 B2 | 11/2014 | Innes |
| 8,930,030 B2 | 1/2015 | Bester et al. |
| 8,955,761 B2 | 2/2015 | Malloy |
| 8,965,586 B2 | 2/2015 | Miller et al. |
| 9,043,034 B2 | 5/2015 | Miller et al. |
| 9,103,555 B2 | 8/2015 | Zou et al. |
| 9,328,933 B2 | 5/2016 | Walsh et al. |
| 9,400,119 B2 | 7/2016 | Malloy |
| 9,464,818 B2 | 10/2016 | Holm et al. |
| 9,494,334 B2 | 11/2016 | Sipe et al. |
| 9,494,335 B1 | 11/2016 | Buchanan |
| 9,529,349 B2 | 12/2016 | Marti et al. |
| 9,554,345 B2 | 1/2017 | Rosen |
| 9,618,222 B1 | 4/2017 | Hussain et al. |
| 9,657,958 B2 | 5/2017 | Litomisky |
| 9,705,695 B1 | 7/2017 | Brandman et al. |
| 9,785,155 B2 | 10/2017 | Rhee et al. |
| 9,798,336 B2 | 10/2017 | Przbylski |
| 9,845,966 B2 | 12/2017 | Son |
| 9,851,728 B2 | 12/2017 | Matsuoka et al. |
| 9,933,175 B2 | 4/2018 | Rosen |
| 10,006,642 B2 | 6/2018 | Gluck |
| 10,047,968 B2 | 8/2018 | Barough et al. |
| 10,047,971 B2 | 8/2018 | Nyamjav et al. |
| 10,048,706 B2 | 8/2018 | Hublou et al. |
| 10,082,308 B2 | 9/2018 | Eirkson et al. |
| 10,101,048 B2 | 10/2018 | Marik et al. |
| 10,126,009 B2 | 11/2018 | Flaherty et al. |
| 10,145,597 B2 | 12/2018 | Hur et al. |
| 10,158,498 B2 | 12/2018 | Brandman et al. |
| 10,190,794 B1 | 1/2019 | Zelczen et al. |
| 10,208,973 B2 | 2/2019 | Voight |
| 10,209,689 B2 | 2/2019 | Marti et al. |
| 10,248,089 B2 | 4/2019 | Brun et al. |
| 10,281,937 B2 | 5/2019 | Barrett et al. |
| 10,289,086 B2 | 5/2019 | Marti et al. |
| 10,383,196 B1 * | 8/2019 | Barnes ............... H05B 47/19 |
| 10,390,284 B2 | 8/2019 | Rumler et al. |
| 10,419,243 B2 | 9/2019 | Schubert et al. |
| 10,429,806 B2 | 10/2019 | Hasenoehrl |
| 10,436,615 B2 | 10/2019 | Agarwal et al. |
| 10,443,876 B2 | 10/2019 | Erikson et al. |
| 10,474,118 B2 | 11/2019 | Boicey et al. |
| 10,484,478 B2 | 11/2019 | Brophy et al. |
| 10,489,055 B2 | 11/2019 | Jayaram et al. |
| 10,514,177 B2 | 12/2019 | Hussain et al. |
| 10,514,178 B2 | 12/2019 | Willmott et al. |
| 10,558,178 B2 | 2/2020 | Willmott et al. |
| 10,581,629 B2 | 3/2020 | Brandman et al. |
| 10,620,645 B2 | 4/2020 | Clark et al. |
| 10,627,128 B1 | 4/2020 | Zhang et al. |
| 10,634,377 B2 | 4/2020 | Litomisky |
| 10,641,514 B2 | 5/2020 | Hieke et al. |
| 10,648,687 B1 | 5/2020 | Zhang et al. |
| 10,655,880 B1 | 5/2020 | Zhang et al. |
| 10,670,288 B2 | 6/2020 | Thomle et al. |
| 2013/0208262 A1 * | 8/2013 | Andreussi .......... G01N 21/3103 356/72 |
| 2015/0369504 A1 * | 12/2015 | Flaherty ............... F24F 11/64 700/277 |
| 2016/0018119 A1 | 1/2016 | Desmet et al. |
| 2016/0363341 A1 | 12/2016 | Arens et al. |
| 2017/0003045 A1 | 1/2017 | Sipe et al. |
| 2017/0051938 A1 | 2/2017 | Buchanan |
| 2017/0053441 A1 | 2/2017 | Nadumane et al. |
| 2017/0102156 A1 | 4/2017 | Hasenoehrl |
| 2017/0124229 A1 * | 5/2017 | Rosti ................... G06F 30/20 |
| 2017/0232724 A1 | 8/2017 | Thomas et al. |
| 2017/0370366 A1 | 12/2017 | Johnson et al. |
| 2018/0046149 A1 | 2/2018 | Ahmed |
| 2018/0046151 A1 | 2/2018 | Ahmed |
| 2018/0046173 A1 | 2/2018 | Ahmed |
| 2018/0067508 A1 | 3/2018 | Brown |
| 2018/0068034 A1 | 3/2018 | Zeifman et al. |
| 2018/0186212 A1 * | 7/2018 | Kundu .................. A61L 9/20 |
| 2018/0188712 A1 | 7/2018 | Mackay |
| 2018/0195749 A1 | 7/2018 | Sinha et al. |
| 2018/0299150 A1 | 10/2018 | Ajax et al. |
| 2018/0373234 A1 | 12/2018 | Khalate et al. |
| 2019/0025805 A1 | 1/2019 | Cella et al. |
| 2019/0041882 A1 | 2/2019 | Noboa et al. |
| 2019/0086116 A1 | 3/2019 | Buchanan |
| 2019/0093915 A1 | 3/2019 | Lee et al. |
| 2019/0101306 A1 | 4/2019 | Giorgi et al. |
| 2019/0104399 A1 | 4/2019 | Stamatakis et al. |
| 2019/0141179 A1 | 5/2019 | Dushane et al. |
| 2019/0162433 A1 | 5/2019 | Desmet et al. |
| 2019/0163213 A1 | 5/2019 | Ostrye et al. |
| 2019/0163321 A1 | 5/2019 | Ostrye |
| 2019/0170375 A1 | 6/2019 | Poerschke et al. |
| 2019/0179268 A1 | 6/2019 | Gervais et al. |
| 2019/0179269 A1 | 6/2019 | Gervais et al. |
| 2019/0179270 A1 | 6/2019 | Gervais |
| 2019/0182069 A1 | 6/2019 | Gervais |
| 2019/0207650 A1 | 7/2019 | Kearney et al. |
| 2019/0212026 A1 | 7/2019 | Kim et al. |
| 2019/0215754 A1 | 8/2019 | Ko |
| 2019/0235451 A1 | 8/2019 | Shrivastava et al. |
| 2019/0257537 A1 | 8/2019 | Ko |
| 2019/0264940 A1 * | 8/2019 | Lee ..................... F24F 11/30 |
| 2019/0265768 A1 * | 8/2019 | Zhou .................... G06N 20/00 |
| 2019/0285298 A1 | 9/2019 | Ajamian |
| 2019/0309975 A1 | 10/2019 | Salem et al. |
| 2019/0325334 A1 * | 10/2019 | Kuo ..................... G06N 20/00 |
| 2019/0101304 A1 | 11/2019 | Schubert et al. |
| 2019/0338975 A1 | 11/2019 | Ray et al. |
| 2019/0346170 A1 | 11/2019 | Benefield |
| 2019/0346417 A1 | 11/2019 | Benefiled et al. |
| 2019/0353377 A1 | 11/2019 | Mao et al. |
| 2019/0356513 A1 | 11/2019 | Schubert et al. |
| 2019/0360717 A1 * | 11/2019 | Chae ..................... F24F 11/52 |
| 2019/0360739 A1 | 11/2019 | Brown et al. |
| 2019/0376705 A1 | 12/2019 | Gonia et al. |
| 2019/0376707 A1 | 12/2019 | Emmons et al. |
| 2019/0376715 A1 | 12/2019 | Blanchard |
| 2019/0384238 A1 | 12/2019 | Songkakul |
| 2019/0391573 A1 | 12/2019 | Wang |

(56) References Cited

U.S. PATENT DOCUMENTS

| | | |
|---|---|---|
| 2020/0004214 A1 | 1/2020 | Ahmed et al. |
| 2020/0011566 A1 | 1/2020 | Edwards et al. |
| 2020/0033824 A1 | 1/2020 | Boicey |
| 2020/0036795 A1 | 1/2020 | Brophy et al. |
| 2020/0044876 A1 | 2/2020 | Piccolo, III et al. |
| 2020/0049365 A1 | 2/2020 | Thoni et al. |
| 2020/0092378 A1 | 3/2020 | Brophy et al. |
| 2020/0116380 A1 | 4/2020 | Willmott et al. |
| 2020/0166229 A1 | 5/2020 | Bentz et al. |
| 2020/0224915 A1* | 7/2020 | Nourbakhsh ...... G01N 33/0034 |
| 2020/0250774 A1* | 8/2020 | Agarwal ................ H04Q 9/00 |
| 2020/0298163 A1* | 9/2020 | Baxter ............... B01D 46/0068 |
| 2021/0140447 A1* | 5/2021 | Latulippe .............. F04D 29/646 |
| 2021/0164682 A1* | 6/2021 | Mujumdar ........... G05B 19/042 |
| 2021/0207838 A1* | 7/2021 | Harrison ............ G06K 9/00771 |

FOREIGN PATENT DOCUMENTS

| | | | |
|---|---|---|---|
| CN | 111103220 A | * | 5/2020 |
| CN | 112964684 A | * | 6/2021 |
| EP | 3382491 A2 | | 10/2018 |
| WO | 2019067645 A1 | | 4/2019 |

OTHER PUBLICATIONS

Zhang, "A Bio-Sensing and Reinforcement Learning Control Systems for Personalized Thermal Comfort and Energy Efficient," Building Performance and Diagnostics School of Architecture, Sep. 26, 2019, pp. 1-199.

Ahmed, et al., "Computational Intelligence Techniques for HVAC Systems: A Review," Build Simul, 2016, pp. 359-398.

Cheng, et al., "Artificial Intelligence-Assisted Heating Ventilation and Air Conditioning Control and the Unmet Demand for Sensors: Part 1, Problem Formulation and the Hyphothesis," Sensors, 2019, pp. 1-30, vol. 19, No. 1131.

"Adaptive Algorithm for the Control of a Building Air Handling Unit," US Department of Commerce, Oct. 1982, pp. 1-54.

Barnes, U.S. Appl. No. 17/185,154, entitled, "Machine Learning Systems for Modeling and Balancing the Activity of Air Quality Devices in Industrial Applications," filed Feb. 25, 2021.

* cited by examiner

MACHINE LEARNING SYSTEMS FOR MODELING AND BALANCING THE ACTIVITY OF AIR QUALITY DEVICES IN INDUSTRIAL APPLICATIONS

CROSS REFERENCE TO RELATED APPLICATION

This application is a continuation of and claims priority to U.S. patent application Ser. No. 17/185,154, entitled "Machine Learning Systems for Modeling and Balancing the Activity of Air Quality Devices in Industrial Applications" and filed on Feb. 25, 2021, which is incorporated herein by reference.

BACKGROUND

Industrial facilities are often built with large open areas in which both workers and sensitive materials are present. In some cases, the processes performed in an industrial facility may negatively influence the climate and air quality of the facility, making it hazardous or inhospitable to the environment inside or outside the facility, or may lead the air quality to exceed or contravene regulatory or environmental health and safety requirements. To stop or mitigate negative effects on air quality, industrial facilities use air handling systems responsible for providing fresh, conditioned outside air (or recycled air) and/or removing air from within the facility. Air handlers such as heating, ventilation and air conditioning (HVAC) units and make-up air units (MAUs) may be individually controlled via a thermostat or basic on/off switches. The facilities may also be cleaned through some sort of stack or baghouse system or exhaust units.

Residential or commercial facilities may also use air handling systems, but unlike industrial facilities, residential or commercial facilities are generally focused on human comfort, i.e., keeping the facility within a comfortable temperature for a person's living conditions. Residential facilities are often much smaller than industrial facilities, and commercial facilities may have less large open indoor space than industrial facilities. Further, both residential and commercial facilities have less safety hazards than are present in industrial environments. Accordingly, the air handling systems for residential or commercial facilities (such as a single HVAC unit, or a jointly controlled set of identical HVAC units) are directed to different needs and considerations than those of industrial applications.

Further techniques to effectively manage air quality in industrial applications are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

Figure 1:
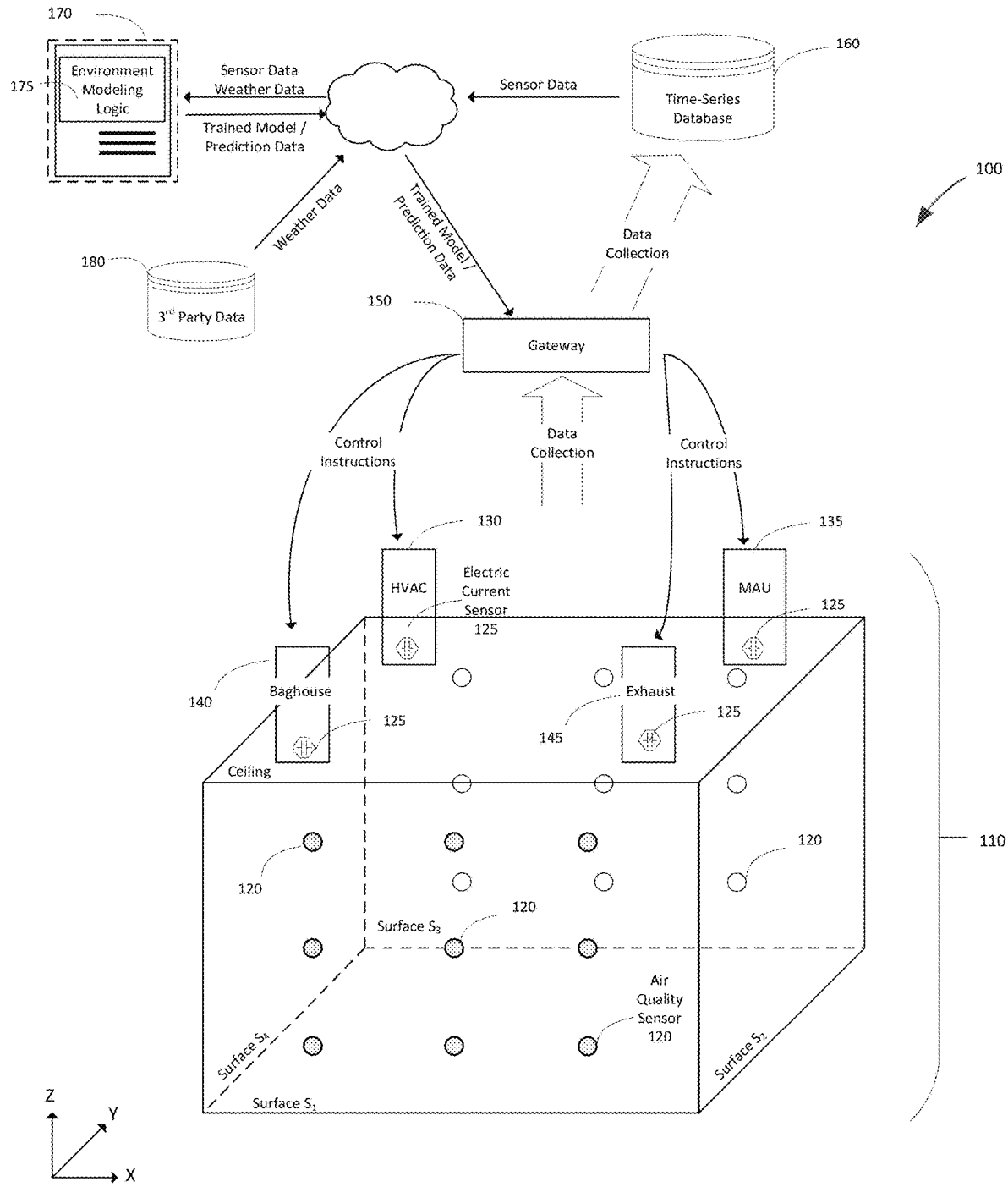
FIG. 1 is a diagram of an exemplary air handling system deployed in an indoor facility, in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure generally pertains to control systems and methods for the modeling and management of air quality systems in industrial applications. For example, the disclosure is directed to automated solutions for balancing diverse air quality devices through the application of machine learning technology.

In an exemplary embodiment, an indoor air quality control system may be implemented to control a plurality of air handling and distribution units within an industrial facility in a concerted effort to affect an overall air quality goal. An implementation of the air quality control system may include any of air handling units, air distribution units, baghouses, exhaust systems, sensor devices, site management devices, and/or supporting computing resources, and other physical and logical components relevant to implement air handling equipment in/for a single facility. In an exemplary embodiment, a plurality of sensors are positioned to operate at different physical locations throughout (and in some embodiments both inside and outside) an enclosed facility such as a building or similar manufacturing location in which the air can be controlled. The sensors variously measure environmental values relevant to air quality, such as humidity, temperature, air pressure, a level of contaminants, and the like. In some embodiments, the system may leverage existing nodes and/or networked lighting systems to add additional sensing capability or to add additional communication flexibility to the mesh network. The sensors, together with one or more other devices, may act as a wireless mesh network to transfer and receive data across the facility. The sensors operate periodically to sense their respective environmental conditions, and the sensor data is sent, through the mesh network, to a gateway device. The gateway device may store the sensor data in a database, either local or remote to the gateway.

In some embodiments, one or more remote servers analyze the sensor data, historical data, and other environmental data (e.g., predicted weather data) in a dataset, and use one or more machine learning algorithms to model the air quality within the facility. In the exemplary embodiment, the sensor data is considered holistically (and sometimes in an aggregated or stratified manner), that is, the sensed air quality data is considered in a pervasive analysis of the overall condition of the facility, rather than individual, independent analyses of data with respect to the position of each sensor. As the sensors continue to provide additional data (through periodic sensing), machine learning techniques may be applied to progressively generate modified, improved models and algorithms for decision making. The models predict the behavior of the air in the facility given a variety of parameters indicating correlation between collected data and air quality, and are used to identify actions to take to meet desired air handling goals. Error minimization functions may be applied over the predictive models to adhere the outputs of the models to a desired optimization target (or one or more of several goals or desired outcomes), such as energy usage, particulate concentration, temperature, humidity, and/or pressure. The decisions regarding the limitations and/or goals of the model are done in accordance with various appropriate environmental health and safety considerations, as defined by a site administrator, industry standard, and the like.

In some embodiments, information indicative of how temperature, pressure, humidity, contaminants, and other air conditions change at and through different points in the facility may be calculated and used as input(s) to the machine learning analysis of the behavior of air in the facility. A gradient from sensor to sensor and/or the flow of particulates through the facility may be determined based on the measured readings at two or more sensors at known locations. Additionally, a rate of change at one or more sensors over a period of time can be measured and calculated. Measurement of these changes (that is, the delta value of change, a rate of change, or the like) can be computed, e.g., by software, based on data from one or more different sensor points into the facility, and the calculated changes fed into one or more machine learning algorithms in addition to individual sensor readings.

In the exemplary embodiment, the air handling models are applied to the current sensor data to generate instructions, used by the gateway, to control various air quality equipment in the facility to reach an optimized result. For example, the instructions may be used to selectively turn components on or off, or more finely control those with variable settings. Rather than evaluate the actions of each air handling unit, MAU, baghouse, exhaust, lighting, and/or other equipment in isolation, the instructions are configured to individually calibrate the operation of each of the multiple units to perform certain actions, the individual actions taken by the unit having been calculated in furtherance of a holistic treatment of the facility. In an exemplary embodiment, the control instructions generated based on the air handling predictive model (and passed through the mesh network of devices by the gateway) are comprehensive of all types of equipment, and across multiple units and multiple types of units, functioning together to improve air quality. As a result, for instance, a set of instructions may be passed to a first device to alter its activity based on sensed data from a second, differently-located device.

In conventional solutions directed to residential and commercial facilities, the focus of an air handling system is typically on the comfort of the occupants. A residential application may have a single HVAC unit with an air handler, and any control of this unit to heat and cool is done to keep the unit functioning within a desired temperature range. A commercial application (such as an office or retail space) may have a centralized HVAC with a cooling or heating agent to push air out to any of many air handlers. However, as with a residential application, these air handlers are often identically controlled (multiple devices controlled as a single unit), and again, can be limited in scope to accommodating human comfort. In conventional industrial applications, sensors (e.g., thermometers) controlling an HVAC unit are limited to a discrete set of knowledge sensed by and relating to itself (the data collected by the single sensor). Even if the actions of one HVAC unit (or MAU, baghouse, etc.) influences surrounding sensors, there is no coordination of individual knowledge or action between different sensors and attached air handling or distribution units.

In contrast, by virtue of the systems and methods described herein, intelligent control of unit-level activity is holistically applied across different types of air handling equipment to provide a more efficient solution. Rather than controlling one HVAC or one system, the air handling systems described herein control many different types of equipment to provide optimal air quality and environmental health. Because the learning algorithms described herein can be optimized for any of several different goals, facility-specific and industry-specific sets of rules can be sustained. Further, the application of machine learning creates an air handling system that is not solely reactive to sensed immediate-need problems, but instead considers long-term goals (e.g., one or more hours ahead) to maintain and improve air quality in a sustainable, energy-efficient way. In certain embodiments, for example when used in a manufacturing facility, this may improve equipment and manufacturing uptime. Accordingly, environmental health and safety conditions can be met in an automated fashion, while reducing wasted energy and labor resources.

Further, unlike conventional solutions that primarily optimize for human comfort, the systems and methods described herein are directed to air handling control in industrial facilities. As a result, the disclosed systems focus on improved mechanisms for maintaining worker safety compliance, maintaining environmental pollutant compliance, and maintaining acceptable climate conditions for sensitive materials and/or equipment, these conditions being set by appropriate health and safety standards specific to the purpose and needs of the facility, and in accordance with industry standards.

Additionally, the functionality of the system and methods described herein can be applied to existing industrial installations, and is not limited to new construction or new installations of air handling devices or networks. Therefore, even when the existing hardware in a facility is not capable of performing a desired level of analysis or control, the site control devices described herein can be configured to interface with existing hardware to implement control decisions made based on modelled behavior. Also, additional pre-existing networked devices (such as lighting nodes) may be used to facilitate transmission of air handling instructions over a mesh network, simplifying and increasing the reliability of networked communication. Because of this, facilities can reduce or avoid heavy time, money, and labor investment in installing updated hardware and software in large-scale facilities.

FIG. 1 depicts an exemplary air handling system 100, in accordance with some embodiments of the present disclosure. As shown, a plurality of sensors are positioned to operate at different physical locations within a facility 110. Facility 110 is, in the exemplary embodiment, a manufacturing location with a large open indoor space, but can be any industrial space of any shape or configuration that is not (or not completely) an open-air location, whether one or more multiple rooms, or any location in which air handling equipment can be controlled to affect the environmental conditions. In the illustrated embodiment, a gateway 150 (or other type of site controller) operates to communicate over a wireless network with air-quality sensors 120, air handling and distribution units (e.g., any combination of one or more of HVAC 130, MAU 135, baghouse 140, exhaust 145), a time-series database 160, and/or a remote server 170 (which may include one or more application servers). Gateway 150 may be configured to execute an air quality prediction algorithm, developed at the server 170 using an environment modeling logic 175 based on data from time-series database 160, data from one or more third party databases 180, and/or other data from gateway 150, to generate instructions for controlling the air handling and distribution units 130, 135, 140, and 145. In another embodiment, the generation and training of the air quality prediction algorithm (which may include one or more machine learning algorithms) is performed at the gateway 150; that is, the components and/or functionalities of the server 170 discussed herein (or portions thereof) may be incorporated into the implementation of the gateway 150.

A plurality of sensors deployed within the facility 110 each variously measure environmental values within a respective sensor's range that are relevant to air quality, such as humidity, temperature, air pressure, a level of contaminants, and the like. In an exemplary embodiment, the sensors are sufficient in number and position to measure these conditions across the entire facility. Wireless air quality sensors 120 measure values such as temperature, humidity, pressure, VOC, carbon monoxide, smoke, metal particulates, or other contaminants or pollutants. These air quality sensors may be placed in a 3-dimensional grid pattern throughout all or part of the facility, though any appropriate configuration may be used given the size and shape of the facility, and the placement need not conform to a gridlike or otherwise regular pattern. While FIG. 1 only illustrates sensors 120 on a front and back interior wall of a room (shown as surfaces $S_1$ and $S_3$, the sensors on these surfaces being shown in gray and white, respectively) for ease of illustration, such is merely exemplary and sensors 120 may be positioned at any location, both internal and external to the facility. Because the exemplary sensors are wireless, the positioning of these sensors is not limited to walls, ceilings, or floors, and indeed, such may be positioned at any appropriate point in a 3-dimensional space (e.g., on columns, furniture, underneath or within surfaces, and so on). Outdoor sensors may measure data such as air-pressure, temperature and humidity. Electric current sensors 125 are placed on HVAC 130, MAU 135, baghouses 140, exhaust fans 145, de-stratification fans, other packaged units (not specifically shown), or any other air handling, conditioning, or distribution units, to monitor the state of the respective units. Data is collected frequently from each of the sensors 120 and 125. While only four air handling or distribution units and only 22 sensors are illustrated in FIG. 1 for ease of illustration, in practice the number and variety of units and sensors may differ, given the size and needs of the facility. Additionally, not every facility may need every type of sensor, and it may be generally understood that the systems described herein can take in information from any non-zero number or type of sensors and send control instructions to any number or type of air handling, conditioning, or distribution units.

Figure 2A:
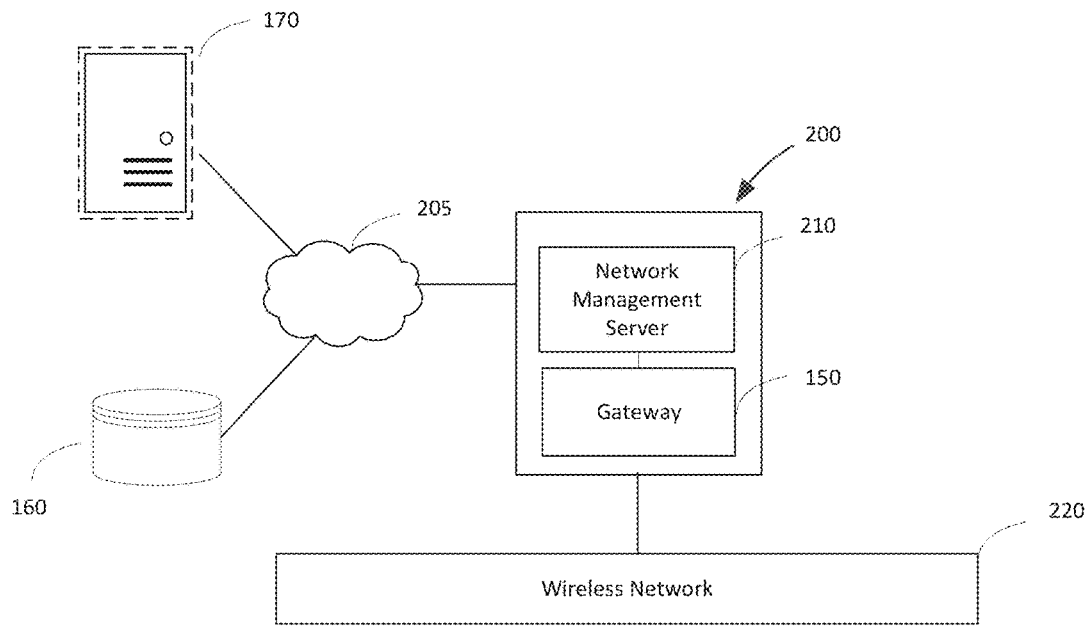
FIG. 2A is a block diagram of an exemplary wireless network in accordance with some embodiments of the present disclosure.

FIG. 2A depicts an exemplary embodiment of a site controller 200 for managing a wireless network 220. The site controller 200 comprises a network management server 210 coupled to a gateway 150 (also referred to herein as an air handling control unit). In an exemplary embodiment, network management server 210 and gateway 150 are different logical components of site controller 200, such that the components may reside within the same housing and/or share resources such as processing hardware, and in other embodiments they may be discrete network devices connected via a wireless or wired connection. In an alternate embodiment, the functionalities of network management server 210 and gateway 150 are all performed by a single logical component of the gateway 150. For ease of reference, the functionalities described herein with respect to gateway 150 may be understood to, in other embodiments, be implemented by different components of the site controller 200.

In some embodiments, the gateway 150 may receive messages from the wireless network 220 and encapsulate such messages in accordance with TCP/IP or other protocol for transmission of the messages to the network management server 210 through a WAN, LAN, or other type of network. Messages from the wireless network 220 to be transmitted to other destinations may be similarly encapsulated or otherwise converted into a different protocol as may be desired. In the opposite direction, the gateway 150 may de-encapsulate messages received from a WAN or other type of network to remove overhead for routing messages. Gateway 150 may also generate messages (e.g., control messages) and transmit those messages to destinations on the wireless network 220. In addition to, or as an alternative to, wireless communication, any or all of the components of the system 200 may be coupled to another component through a physical medium. In the present disclosure, for ease of discussion, the term "gateway" is disclosed as managing a "network," however it is understood that the gateway may instead manage a portion of a network, or a subnetwork containing only a subset of devices of the entire wireless network. Additionally, while the term "gateway" is used, it will be understood that such term can refer to any device that joins two networks (or subnetworks) so as to allow communication therebetween, even if the device performs other additional functions including non-network management functions. The gateway is understood to refer to either hardware or software or any combination thereof.

In some embodiments, gateway 150 receives data from and transmits data to one or more of server 170 and databases 160 and/or 180. In some embodiments, server 170 and databases 160 and 180 may be local to gateway 150 (e.g., within the facility or otherwise communicatively coupled via local means), and in others, they may be located remotely, so as to be accessible through network 205. Network 205 may include, in the exemplary embodiment, any type of (or any combination of one or more of) wired network, such as Ethernet or fiber optics, wide area network (such as the Internet), local area network (such as an intranet), cellular network (e.g., Sprint, AT&T, or the like) or another type of wireless network, such as Wi-Fi, Bluetooth, Bluetooth Low Energy, and/or other close-range wireless communications. In various embodiments, network 130 may be any IP-enabled network, including microwave, radio, and the like. In still other embodiments, one or more of any of the above-listed network types may be used, or any combination thereof.

For illustrative purposes, it can be assumed that any of the components of FIG. 2A are capable of wireless communication with any device or component connected to it (either directly or indirectly) by the depicted lines. However, it will be noted that in addition to, or as an alternative to, wireless communication, any or all of the components may be coupled to another component through a physical medium.

Figure 2B:
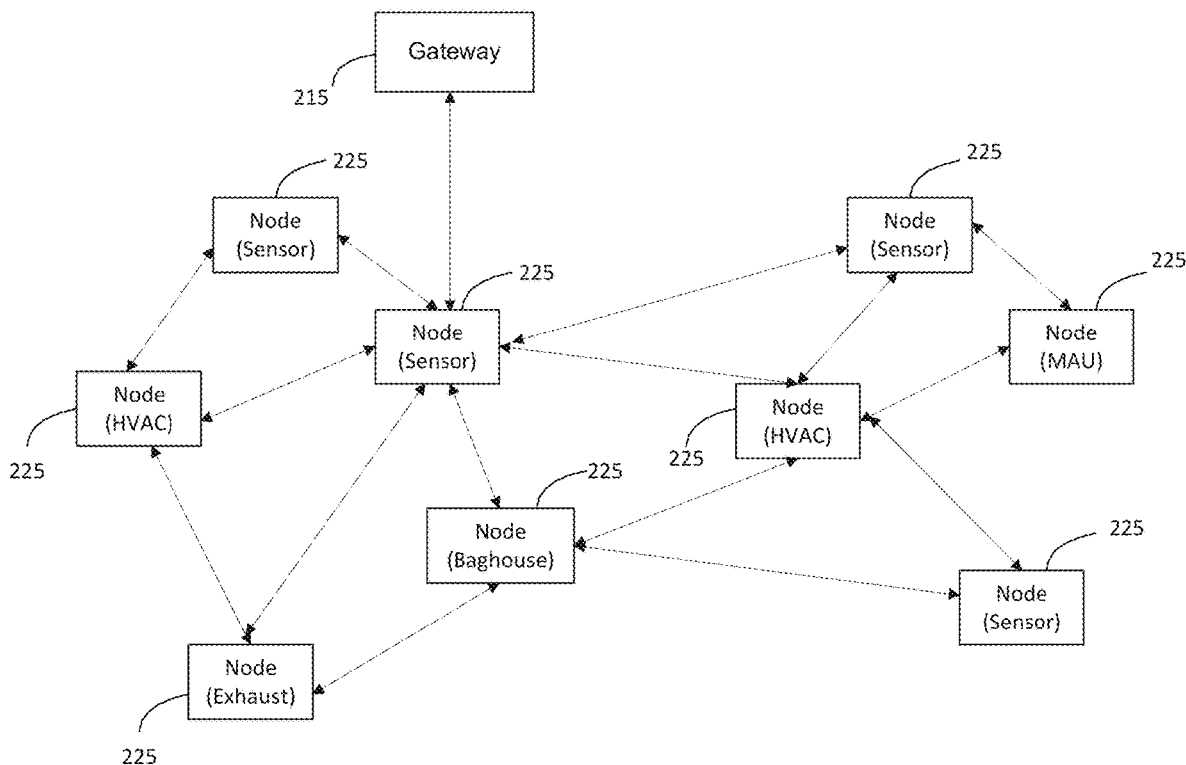
FIG. 2B is a block diagram of an exemplary wireless mesh network in accordance with some embodiments of the present disclosure.

As shown in FIG. 2B, wireless network 220 may be a network of devices, each illustrated as a node 225. Nodes 225 function, in an exemplary embodiment, to implement an ad hoc mesh network. Each node 225 can be stationary (fixed in place within the facility) or can be mobile, such that it can be moved to a different physical location. In some embodiments, this network may be topologically variable, as mobile nodes may move to a different location, additional nodes may be added, or nodes may become inaccessible. Different types of wireless or, alternatively, wired networks (or combinations thereof) are possible in other embodiments. In one exemplary embodiment, the nodes 225 communicate among one another wirelessly, but it is possible for any of the nodes 225 to communicate with any of the other nodes 225 over a conductive medium. In other embodiments (not specifically shown), use of a gateway may be unnecessary and gateway 150 may instead have a communication device, such as an RF radio, that permits the network management server 210 to communicate directly with the wireless network 220 in accordance with the protocol used by the wireless network 220. In general, gateway 150 uses multicast messaging to communicate with nodes 225 across the network 220, such that messages may be sent to multiple nodes from a first transmitting node. In other embodiments, unicast messages, broadcast messages, and/or other types of communication may be used.

Nodes 225 may include any variable number or type of devices. In the exemplary embodiment, a node 225 may be any of the sensors or devices described above with reference to FIG. 1, e.g., air-quality sensors 120, electric current sensors 125, other types of sensors, HVACs 130, MAUs 135, baghouses 140, exhaust fans 145, de-stratification fans, packaged units or any other key air handling, conditioning, or distribution units. In some embodiments, lighting systems installed in the facility may additionally or alternately act as networked nodes 225. Exemplary lighting systems are described in commonly-assigned U.S. Pat. No. 9,374,874, entitled "Lighting Control Systems and Methods" and issued on Jun. 21, 2016, which is incorporated herein by reference. In still other embodiments, a node 225 may be a sensor or air handling device with lighting components. The particular configuration of the network and types of nodes on the network depend of course on the type, size, and configuration of the sensors and devices in the facility.

Figure 2C:
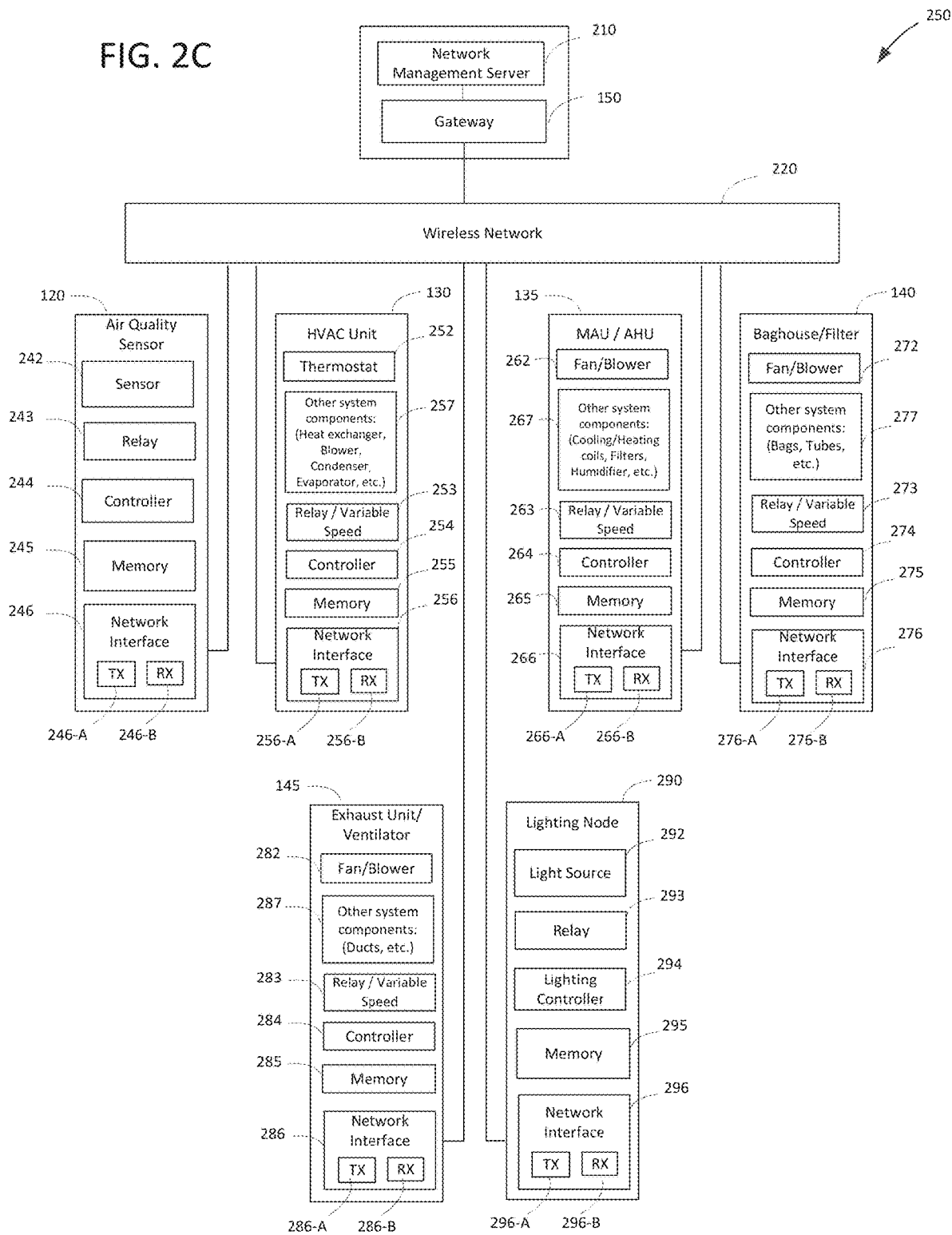
FIG. 2C is a block diagram of an exemplary network of air handling devices, in accordance with some embodiments of the present disclosure.

FIG. 2C depicts exemplary components of some of the possible nodes on a network 220, specifically, an embodiment where an exemplary each of an air quality sensor 120, HVAC unit 130, MAU (or other air handling unit (AHU)) 135, baghouse (or other filtering unit) 140, exhaust unit 145, and lighting node 290 function as a network node 225 that communicates over the wireless network 120. While only one of each type of node is shown, this is merely exemplary and other embodiments may include any number of the various types of nodes (or a subset of the various types) and any number of total nodes. Additionally, while certain component parts of each type of node are mentioned herein or illustrated, the nodes or devices are not so limited, and any known feature relevant to the functioning of the device may be included in the various embodiments, including add-ons or interfaces that are not strictly necessary for air handling functions.

An exemplary air quality sensor 120 may comprise one or more sensors 242 (measuring any relevant environmental value(s) within the sensor's range that are relevant to air quality, such as humidity, temperature, air pressure, a level of contaminants, and the like). The sensor 120 may also include a controller 244 for controlling the sensor (e.g., turning it on/off), a relay 243 configured to regulate the supply of electrical current to the sensor 242 based on control signals from the controller 244, and a network interface 246 for communicating via wireless (e.g., RF) signals comprising a transmitter (TX) 246-A for transmitting a wireless signal and a receiver (RX) 246-B for receiving a wireless signal.

An exemplary HVAC unit 130 may comprise one or more thermostats 252 (measuring temperature and the like), a controller 254 for controlling the thermostat (e.g., turning it on/off, changing the heating/cooling setpoints, and/or changing the fan mode), a relay or digital bus 253 configured to change thermostat settings and read data from the thermostat 252, based on control signals from the controller 254, and a network interface 256 for communicating via wireless (e.g., RF) signals comprising a transmitter (TX) 256-A for transmitting a wireless signal and a receiver (RX) 256-B for receiving a wireless signal. HVAC 130 may also include one or more other system components 257 that may (or may not) be controlled based on control signals from the controller 254, such as a heat exchanger, blower/fan, condenser, evaporator coil, combustion chamber, compressor, or any other controllable element.

An exemplary MAU 135 or other air handling unit (AHU) may comprise one or more fans or blowers 262, a controller 264 for controlling the fans/blowers (e.g., turning on/off or changing to any of a variable speed if appropriate), a relay 263 configured to regulate the supply of electrical current to the fans/blowers 262 based on control signals from the controller 264, and a network interface 266 for communicating via wireless (e.g., RF) signals comprising a transmitter (TX) 266-A for transmitting a wireless signal and a receiver (RX) 266-B for receiving a wireless signal. MAU 135 may also include one or more other system components 267 that may (or may not) be controlled based on control signals from the controller 264, such as heating coils, cooling coils, filters, humidifiers, or any other controllable element.

An exemplary baghouse 140 or other filtering unit may comprise one or more fans or blowers 272, a controller 274 for controlling the fans/blowers (e.g., turning on/off or changing to any of a variable speed if appropriate), a relay 273 configured to regulate the supply of electrical current to the fans/blowers 272 based on control signals from the controller 274, and a network interface 276 for communicating via wireless (e.g., RF) signals comprising a transmitter (TX) 276-A for transmitting a wireless signal and a receiver (RX) 276-B for receiving a wireless signal. Baghouse 140 may also include one or more other system components 277 that may (or may not) be controllable based on control signals from the controller 274, such as bags, tubes, etc., for example, compressed air to pulse the bags on a certain frequency.

An exemplary exhaust unit 145 or other ventilating unit may comprise one or more fans or blowers 282, a controller 284 for controlling the fans/blowers (e.g., turning on/off or changing to any of a variable speed if appropriate), a relay 283 configured to regulate the supply of electrical current to the fans/blowers 282 based on control signals from the controller 284, and a network interface 286 for communicating via wireless (e.g., RF) signals comprising a transmitter (TX) 286-A for transmitting a wireless signal and a receiver (RX) 286-B for receiving a wireless signal. Exhaust unit 145 may also include one or more other system components 287 that may (or may not) be controllable based on control signals from the controller 274, such as ducts, etc.

An exemplary lighting node 290 may comprise a light source 292 such as a light emitting diode (LED) (or if appropriate, a laser diode, a fluorescent lamp, an incandescent light, or other light source) mounted in a lighting fixture, a lighting controller 294 for controlling the light source 292, a relay 293 configured to regulate the supply of electrical current to the light source 292 based on control signals from the lighting controller 294, and a network interface 296 for communicating via wireless (e.g., RF) signals. Network interface 296 may comprise a transmitter (TX) 296-A for transmitting a wireless signal and a receiver (RX) 296-B for receiving a wireless signal.

In some embodiments, each of (or a subset of) network interfaces 246, 256, 266, 276, 286, and/or 296 may use wireless (e.g., via radio frequency (RF)) communication to transmit/receive data to and from other nodes, other devices (e.g., assets or tags) on the network, and/or the gateway 150. In other embodiments, these devices could alternately communicate with infrared or ultrasound technology, or any other appropriate type of wireless communication. Further, each node may include one more memories (illustrated as elements 245, 255, 265, 275, 285, and 295). These memories may comprise any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. The nodes may also include one or more processing element(s) (not specifically shown, such as one or more central processing units (CPU), digital signal processors, other specialized processors or combination of processors, application-specific integrated circuits (ASICs), field-programmable gate arrays (FPGAs), microprocessors programmed with software or firmware, and/or any other circuitry that communicates to and drives the other elements within the node.

Figure 3A:
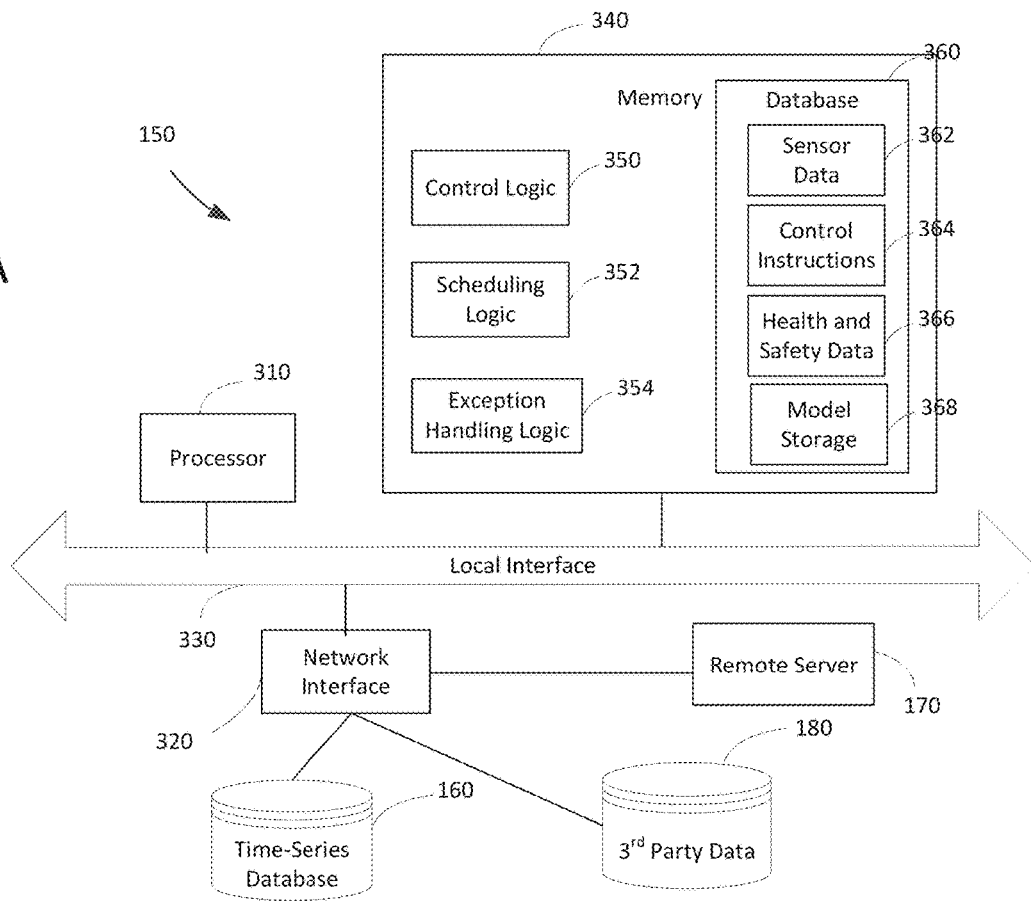
FIG. 3A is a block diagram of certain component parts of a network gateway device in accordance with some embodiments of the present disclosure.
Figure 3B:
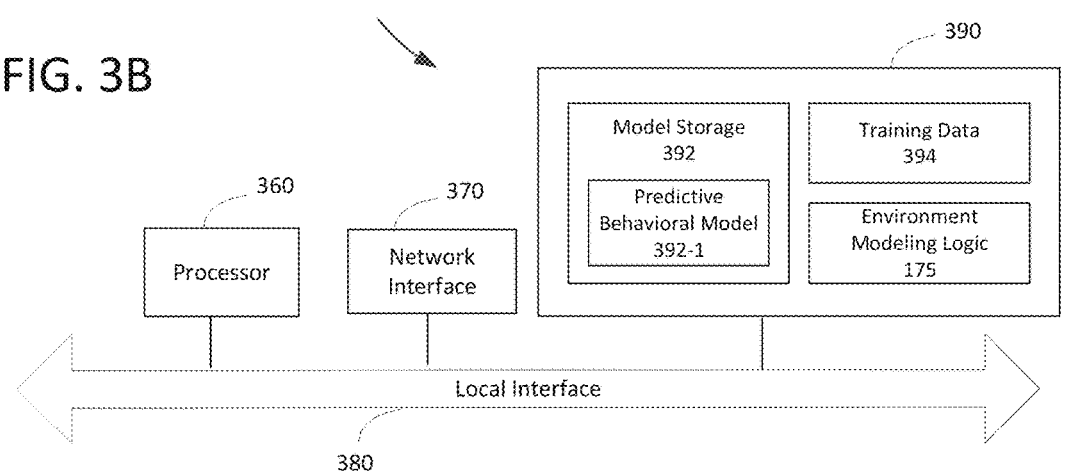
FIG. 3B is a block diagram of certain component parts of a remote server device in accordance with some embodiments of the present disclosure.

FIG. 3A depicts an example schematic diagram of components of a gateway 150 in accordance with an exemplary embodiment of the present disclosure. FIG. 3B depicts an example schematic diagram of components of a remote server 170 in accordance with an exemplary embodiment of the present disclosure. While FIGS. 3A and 3B illustrate certain respective configurations of components, it can be understood that any practical configuration may be used, and the components need not fall into the particular logical groupings illustrated in FIGS. 3A and 3B. Further, it will be generally understood that the architectures described below and illustrated in the figures are not limited to the components discussed herein, and may include other hardware and software components. Rather, for ease of illustration, only the components and functionalities most relevant to the subject systems and methods are discussed herein.

The exemplary gateway 150 comprises at least one processor 310, such as one or more central processing units (CPU), digital signal processors (DSP), graphics processing units (GPU), application-specific integrated circuits (ASICs), field-programmable gate arrays (FPGAs), and/or microprocessors programmed with software or firmware, other specialized processor or combination of processors, or other circuitry that communicates to and drives the other elements within gateway 150 via a local interface 330, which may include at least one communication bus. In some embodiments, the processor 310 may comprise, in whole or in part, an artificial neural network or other type of configuration for performing machine learning functions based on instructions stored in memory 340.

The gateway 150 has a network interface 320 for enabling communication (directly or indirectly) with other devices, including the nodes 225 and other objects capable of RF communication such as RF-capable tags. In an exemplary embodiment, network interface 320 enables the gateway 150 to communicate with network management server 210 and/or in some embodiments, remote devices such as server 170, such communication typically being performed over a wide area network (WAN), such as, for example, the internet, local network(s), or other type of network. In an exemplary embodiment, the network interface 320 is configured to communicate wirelessly over one or more geographic areas, but the interface 320 may alternately or additionally facilitate exchange of data via a physical medium.

The gateway 150 has a memory 340 that stores a control logic 350 for generally controlling the operation of the gateway. The control logic 350 may also be configured to, via the network interface 320, communicate with the nodes 225 by transmitting messages to or receiving messages from their respective network interfaces 246, 256, 266, 276, 286, 296 in order to control their operation, for example, to obtain sensor or status information from the nodes, push instructions, or the like. For example, where a node 225 is a HVAC unit 130, the control logic 350 may communicate with a control interface of the HVAC 130 to manage an on/off state or to send instructions with planed or scheduled on/off periods, temperatures and/or speeds at which to operate, or the like. The control logic 350 can be implemented in software, hardware, firmware, or any combination thereof.

Memory 340 may also store a scheduling logic 352 and/or an exception handling logic 354 for determining instructions for controlling operation of one or more networked nodes 225 within an RF range of the network. In some embodiments, the functions of scheduling logic 352 or exception handling logic 354 (or a subset of either) may be performed by the control logic 350. Memory 340 may also store a database 360 comprising sensor data 362 (which in some embodiments may include aggregated, manipulated, or otherwise processed sensor data), control instruction data 364 (which may include instructions or schedules relating to the nodes of network 220), health and safety data 366 (which may include data regarding one or more environmental, health and safety standards or regulations), and/or model stage data 368. While a single database 360 is depicted in FIG. 3A, some embodiments may instead use one or more databases or may use a database shared by other components separate from the gateway 150. Further, while FIG. 3A refers only a single "map", "table", or "database," it will be understood that these components are not so limited nor is any particular form or configuration of data storage mandated, and the described "databases" may alternatively be indexed tables, keyed mappings, or any other appropriate data structure(s). Various other data and code can also be written to or read from memory 340.

As used herein, memory 340 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. While FIG. 3A illustrates a single discrete memory 340, it will be understood that the embodiments described herein are not limited to any particular arrangement and that other embodiments may store information in one combined memory, or with information stored in a different configuration in one or more memories, some local to the other components illustrated in FIG. 3A and/or some shared with, or geographically located near, other remote computing systems.

Control logic 350, scheduling logic 352, and/or exception handling logic 354 may be implemented in software (as in FIG. 3A), hardware, firmware, or any combination thereof. In some embodiments, scheduling logic 352 (and in some embodiments control logic 350 and/or exception handling logic 354) may be implemented in whole or in part as a machine learning system (e.g., neural network software) for achieving the functionalities described herein, for example, using one or more machine learning algorithms, as described in more detail below. When the machine learning system is implemented in hardware, it may be integrated into a hardware chip to form a part of the processor 310. For example, the machine learning system may be manufactured in the form of a dedicated hardware chip for artificial intelligence, or may be manufactured as part of a conventional general purpose processor (e.g., a CPU or an application processor) or a graphics dedicated processor (e.g., a GPU). Control logic 350, scheduling logic 352, and/or exception handling logic 354, when implemented in software, can also be stored on any computer-readable medium, for example electronic, magnetic, or optical mediums, among others, or another system, apparatus, or device. In the embodiment of FIG. 3A, logics 350, 352, and 354 are implemented by the processor 310 or may in other embodiments be implemented by any other circuitry capable of executing the instructions thereof.

Figure 4A:
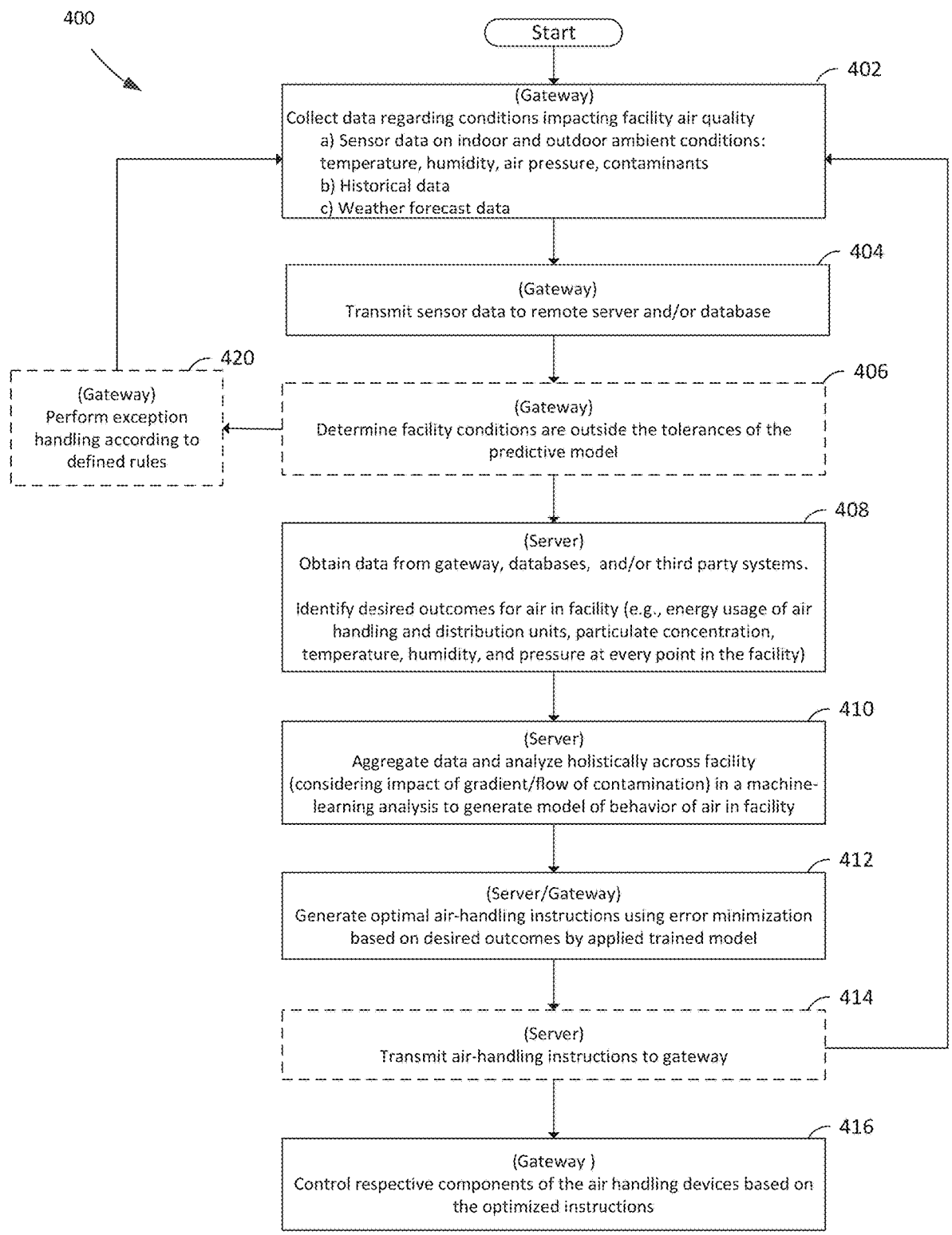
FIG. 4A is a flowchart of an intelligent process for controlling components of an exemplary air handling system, in accordance with some embodiments of the disclosure.

FIG. 4A depicts an exemplary process 400 of taking in data from sensors positioned within and/or outside a facility, intelligently analyzing that data to train a machine learning model to predict an overall condition of the air within the facility, generating air-handling instructions using the model that optimize for a defined air handling goal, and controlling the operations of various types of air quality equipment within the facility based on those instructions. The process 400 is repeated periodically as the sensors collect additional data, and the models are continuously retrained with the benefit of the additional data.

With reference to FIG. 1, a plurality of sensors 120, 125 are configured to periodically measure conditions relating to an air quality of a sensed area. At step 402, the sensors collect this data and transmit the data to the gateway 150 via the mesh network 220. Sensors within the facility will collect data on indoor ambient conditions, while sensors on the outside of the facility (e.g., on the roof or outside walls or positioned farther away from the building) collect data on outdoor ambient conditions. These conditions may variously include, for instance, temperature, air density, air pressure, a level of contaminants (for example, targeted measurements of carbon monoxide, ozone, particulate matter (dust), sulfur dioxide, nitrogen dioxide, carbon monoxide, lead, welding fumes, oxygen, other toxic or non-toxic air pollutants) or any other appropriate condition. The specific contaminants measured may depend on the type of sensors, the type of facility, the predefined instructions of a site administrator, and, in the exemplary embodiment, the health and safety requirements and/or environmental requirements that apply to the industrial facility. In an exemplary embodiment, sensors 120, 125 are each respectively dedicated to the collection of one type of data (for example, in the interest of speed of collection, energy use, reducing uptime, or the like), however in other embodiments, sensors may exist that collect one or more of a variety of data types or measurements. The data collection occurs based on the air quality at the individual physical position of a sensor and the data is transmitted, by the sensor via multicast messaging, to the gateway 150 where it is stored as sensor data 362.

In the exemplary embodiment, sensor data is collected periodically, e.g., every 15 minutes or another other appropriate amount of time, with each of the sensors collecting data along the same schedule. In other embodiments, each sensor may collect data periodically (e.g., every 15 minutes) but on its own, independently managed schedule. In still other embodiments, a subset of sensors may operate on a different schedule or may not function periodically. For example, some sensors may instead adhere to a set sensing schedule or may perform a sensing operation upon the initiation of a trigger, such as the occurrence of an event, the receipt of a control instruction (from gateway 150, another networked node, a remote device, from within the node 225 containing the sensor, upon an manual instruction (e.g., the push of a button by a site administrator). As just one example, a sensor may not be configured to sense periodically, but may be triggered to perform a sensing operation by an alert or instruction sent from a networked device. As another example, a sensor may periodically perform one type of sensing (e.g., temperature sensing), and may, upon the occurrence of an instruction or event, additionally perform one or more other types of sensing (e.g., air pressure or contaminant sensing). Each sensor may transmit its sensed data to the gateway in accordance with a timestamp or other time-indicating data.

Once sensor data has been collected, the process advances to step 404, at which the gateway transmits sensor data 362 (and in some embodiments, health and safety data 366) to a remote database such as time-series database 160. In one embodiment, gateway 150 may refer to control instruction data 364 or other configuration data stored in database 360 to determine which sensors are configured to transmit sensor results at a given time, and may only proceed to analyze the data if all data has been received. If data from one or more sensors has not been received, the gateway 150 may query those non-transmitting sensors as to their status. In another embodiment, gateway 150 may wait a predetermined period of time from the last (previous) data transmission to receive any transmitted data from the sensors and, upon expiration of that time, may assume that all data has been received. In some embodiments, gateway 150 may, in step 404, transmit sensor data to time-series database 160 upon receipt of all the data or on a rolling basis as sensor data is received, e.g., in real-time or near real-time immediately upon receipt. In an exemplary embodiment, data is received or posted by the gateway 150 via one or more APIs to/from the relevant source/destination device. In some embodiments, the gateway 150 may proceed to step 404 even if it is aware that not all expected sensor data has been received, in the interest of timely control of the facility equipment.

The process then proceeds to step 406, in which the gateway determines, based on the collected sensor data both at the gateway and in the time-series database 160, whether the air conditions in the facility are outside the tolerances of the predictive model (described below). That is, exception handling logic 354 may be configured to recognize the occurrence of an unpredicted event, a dangerous condition, a lack of data, an unusually high or low sensed value or an otherwise unexpected condition. In an exemplary embodiment, the boundaries of "normal" or acceptable facility conditions are not set by human comfort, but rather, are bounded by environmental health and safety standards. In another embodiment, human comfort or livable conditions (e.g., an acceptable comfortable temperature range for humans) may be a secondary factor used in the analysis, while the environmental health and safety of the facility is a primary factor, and therefore a higher priority (or a higher weighted importance) than human comfort. Unlike residential or commercial applications in which not many hazardous conditions may exist, industrial applications may quickly become unsafe if the facility conditions are not optimized to capture and resolve airborne conditions. Accordingly, the predictive model initiates actions in response to sensing conditions of a predicted norm (e.g., alerts, notifications, escalations), and takes proactive steps in controlling air handling units to stop or mitigate the recognized occurrence of an event violating environment health and safety standards.

The normal operation of a facility may be designed to optimize for certain conditions, such as energy savings. As no immediate danger exists in normal operation, the compute time expended by the real-time execution of the predictive model (in the order of seconds or minutes) may be an acceptable delay with which to control or make changes to the facility. However, outside the norm of operation, for some types of exceptions (to an acceptable range of operations), the conditions (e.g., the presence of a high level of contaminants or a high temperature) may be so urgent as to prompt the gateway 150 to take a predefined action to resolve the condition rather than apply a predictive model, as in step 406. In such a scenario, the process proceeds to step 420, in which the gateway 150 executes exception handling logic 354, a set of rules-based logic that sits atop the normal predictive model process. If instead conditions are within a tolerance of the predictive model (step 408), the gateway continues to run the predictive model.

Step 420 defines a set of "exceptional" actions, where if sensor measurements depart from environmental health and safety tolerances, an immediate action, such as an error, alert, signal or siren may be made by the gateway device, by an alarm system (not specifically illustrated), and/or one or more individual air handling units. In one example, gateway 150 may transmit an instruction to a facilities incident management response system (not specifically illustrated), such that a site administer is sent a notification such as a text message, with a preset error message, a report or limited character string with the exceptional condition (e.g., CO alert) or sensor measurement (or delta measurement from an earlier sensed value). In one example, gateway 150 may additionally or alternately trigger emergency actions by one or more of a MAU or baghouse 225 (or all such units, to push or pull air into or out of the facility), and/or trigger sprinkler systems, alarms, or other emergency systems (e.g., emergency lighting systems). In some embodiments, the initiation of emergency actions based on the sensed values by one or more sensors in a certain geographic location would automatically trigger gateway 150 to activate (or deactivate) air handling units within that geographic location (or throughout the facility), e.g., triggering the turning on (or turning up) of all remaining area baghouses, exhausts, and so on. That is, rather than a simple notification, gateway 150 implements its exception handling logic to trigger a responsive physical action within the facility in the interest of environmental safety and health and to control the facility back to acceptable environmental standards. In the case that the deviation from the norm is relatively small, or may not arise to an emergency condition, gateway 150 can use the air handling units 225 to physical manipulate the environmental conditions back within acceptable bounds faster than a site administrator could be notified, arrive, and assess the situation, and faster than the facility could otherwise be shut down or evacuated.

In steps 408 and 410, a predictive model is generated by the environment modeling logic 175 of server 170 to model the behavior of air in the facility. The relevant functionality of the server 170 and the associated hardware and software components are described herein with reference to FIG. 3B. The exemplary server 170 comprises at least one processor 360 such as one or more central processing units (CPU), digital signal processors (DSP), graphics processing units (GPU), application-specific integrated circuits (ASICs), field-programmable gate arrays (FPGAs), and/or microprocessors programmed with software or firmware, other specialized processor or combination of processors, or other circuitry that communicates to and drives the other elements within server 170 via a local interface 380, which may include at least one communication bus. In some embodiments, the processor 360 may comprise, in whole or in part, an artificial neural network or other type of configuration for performing machine learning functions based on instructions stored in memory 390.

According to an exemplary embodiment of the present disclosure, the server 170 has a memory 390 that stores an environmental modeling logic 175. Environmental modeling logic 175 may execute machine learning solutions to model the environment (that is, the air quality) of the facility 110 by analyzing sensor data collected from the nodes 225, historical data stored in time-series database 160, weather data, and/or other obtained data and determining which of those data (or combinations of data) correlate with the facility's behavior. Memory 390 may store the dataset(s) used for the machine learning as training data 394. According to an exemplary embodiment of the present disclosure, the machine learning model stored in the model storage 392 may include predictive model 392-1.

While a single memory 390 and a single model storage 172 is depicted in FIG. 3B, some embodiments may instead use one or more databases or may use a database shared by other components separate from the server 170. Further, while FIG. 3B refers only a single "map", "table", or "database," it will be understood that these components are not so limited nor is any particular form or configuration of data storage mandated, and the described "databases" may alternatively be indexed tables, keyed mappings, or any other appropriate data structure(s). Various other data and code can also be written to or read from memory 390. The server 170 also has a network interface 370 for enabling communication (directly or indirectly) with other devices, including the gateway 150. As used herein, memory 390 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. While FIG. 3B illustrates a single discrete memory 390, it will be understood that the embodiments described herein are not limited to any particular arrangement and that other embodiments may store information in one combined memory, or with information stored in a different configuration in one or more memories, some local to the other components illustrated in FIG. 3B and/or some shared with, or geographically located near, other remote computing systems.

The environmental modeling logic 175 can be implemented in software (as in FIG. 3B), hardware, firmware, or any combination thereof. In some embodiments, environmental modeling logic 175 may be implemented in whole or in part as a machine learning system (e.g., neural network software) for achieving the functionalities described herein, for example, using one or more machine learning algorithms, as described in more detail below. When the machine learning system is implemented in hardware, it may be integrated into a hardware chip to form a part of the processor 360. For example, the machine learning system may be manufactured in the form of a dedicated hardware chip for artificial intelligence, or may be manufactured as part of a conventional general purpose processor (e.g., a CPU or an application processor) or a graphics dedicated processor (e.g., a GPU). When implemented in software, environmental modeling logic 175 can also be stored on any computer-readable medium, for example electronic, magnetic, or optical mediums, among others, or another system, apparatus, or device. In the embodiment of FIG. 3B, environmental modeling logic 175 is implemented by the processor 360 or may in other embodiments be implemented by any other circuitry capable of executing the instructions thereof.

As described herein, environmental modeling logic 175 is executed by processor 360 to model the behavior of air in the facility and predict the condition of the air within a given amount of time. In a case that the air quality deviates to an undesired degree from a desired air quality or facility goals (e.g., temperature, energy use, or the like), or any environmental health and safety standards are not met or exceeded, environmental modeling logic 175 generate air-handling instructions (e.g., functional prompts or commands) to be executed by the individuals air handling units 225 to bring the air conditions within acceptable thresholds. In alternate embodiments, some or all of these functionalities, including the generating, training, and/or execution of a predictive algorithm and/or the generation of instructions for individual air handling units 225, may be performed at or by the gateway 150 or another component within environment 100. However, in an exemplary embodiment, at least the training of one or more predictive models based on collected sensor data is performed at the remote server 170, that is, in the cloud, so as to offload the more compute-intensive activity away from the gateway 150. Other configurations may be variously used as permitted by the computational and resource limitations of the components of environment 100.

The generation of a predictive model relies upon a machine learning solution trained on the set of sensor data in time-series database 160, obtained from gateway 150, and/or obtained from one or more third party data repositories 180. This data may include the sampled air data from the various networked sensors, either received by the gateway 150 and transmitted directly to the server 170 or retrieved from the time-series database 160. Database 160 may store data collected in real-time from the gateway 150, including the most recent sensor data, as well as historical data from previous samples of sensed data. Historical data may be aggregated or sorted by, for example, timestamp or time period. In an exemplary embodiment, historical data is stored indefinitely, however, in other embodiments, available sensor data may be limited for computational or storage efficiency. For example, embodiments may exist where database 160 stores only the most recent data (e.g., the past x day(s), month(s), past year(s), etc.) and discards older data as being less relevant or less reflective of current conditions. In some embodiments, where sensor data from the facility is limited (for example, in a new installation), database 160 may be pre-populated with (or may obtain upon the instruction of a site administrator) data from comparable facilities, as selected by the site administer based on similarity to the facility 110, e.g., similar industry, size, device type and/or number, environmental hazards or conditions, regulatory requirements, weather conditions, or the like. In the exemplary embodiment, the trained model is intended to match the behavior of the particular profiled facility, and therefore, comparable facility data must be selected carefully, if used at all.

Environment modeling logic 175 may further obtain data from one or more third-party servers 180. In one embodiment, this third-party data may include a weather prediction or analysis, such as a determination of predicted atmospheric conditions, outside temperature, pollution forecast. As one example, environmental modeling logic 175 may, at the time of training, on a periodic basis, or in real-time when executing a stored model 392-1, may request weather forecast data from a third-party weather service. This forecast data may be limited in time to, e.g., the next one, six hours, or any appropriate value typically corresponding to the period of time over which the model intends to predict the facility's behavior. In particular, the data may be used by server 170 and/or gateway 150 to determine the impact of feeding outside air into the facility by the local air handling units. As just one example, where the pollutant prediction of the outside air indicates unfavorable conditions, such data may indicate that importing outside air into the facility would negatively impact air quality, and would recommend favoring a filtering, recycled air, or another alternative process.

In some embodiments, environmental modeling logic 175 may leverage other non-air handling devices on the wireless network 220 to obtain additional information about the overall behavior of the facility. For instance, one or more nodes of the wireless network 220 may be lighting systems 290 capable of communicating with the gateway 150, via RF communication, about lighting conditions or other environmental conditions at the physical position of the lighting system. Some lighting systems 290 may be integral with or coupled to sensors capable of sensing values relevant to air quality, humidity, temperature, energy usage, particulate concentration, air pressure or the like, and such sensor readings may additional inform the real-time and historical data used in a machine learning analysis. As just one example, information from lighting systems 290 may inform the overall energy usage of the facility, both by the energy consumption of the lighting systems themselves, as well as the scheduling/modes of the lighting systems, which may provide information regarding the occupancy and use of the facilitate at different days and times.

A goal of the environment modeling logic 175 is to generate a predictive model that optimizes for a given air quality goal that can be met through control of the facility's air handling and distribution units. To this end, in step 408, one or more logics at the server 170 identify at least one desired outcome for the air in the facility. As an example, a desired outcome may include any of energy usage, particulate concentration, temperature, humidity, and/or air pressure, however, in the exemplary embodiment, the particular desired outcome will be determined by a site administrator, for example based on the facility needs (e.g., cost) and/or environmental health and safety regulatory requirements. In some embodiments, the real-time sensor data may indicate that one or more conditions is occurring that should be given precedence over any other routinely-desired system goals.

That is, where the real-time sensor data suggests that the circumstances are approaching (or have reached) values outside of an expected or acceptable range, such as rising/falling temperature, equipment failure, rising energy usage, unsafe particulate or toxicity conditions (whether for human or machine operation), or the like, then in some embodiments the mitigation of the abnormal condition (a conditionally-desired goal) may be taken automatically as the desired outcome or a primary outcome, overriding a predetermined goal input by a site administrator.

In step 410, the collected and aggregated data is used by environment modeling logic 175 to generate training data with which to train an air quality predictive model. The environment modeling logic 175 analyzes historical and real-time sensor data (and/or other third party data, e.g., weather data) as training data to generate a predictive model of the behavior of air within the facility over a particular period of time (one hour or the like). This training data may be stored in one or more training databases 394 at the server 170.

Training data may comprise, as one example, a set of pairs or tuples each comprising a collection of sensor and condition measurements that serve as input to the predictive model, though other embodiments may differ. The sensor and condition measurements may include any of actual values obtained by the sensors, deltas or changes in sensed values, sensor values aggregated by time, location within the facility, network group or subgroup, sensor type (e.g., temperature, pressure, humidity, CO2, contaminant levels, and so on), sensor purpose (e.g., standard/emergency or other grouping), and/or any other appropriate type of delineation or classification of sensor data. In some embodiments, the generation of the tuples is part of a supervised learning process, for example, the parameters and/or weights of the training set may be selected by a network or site administrator. In other embodiments the training may be part of an unsupervised learning process, where environmental modeling logic 175 applies one or more machine learning models to find undetected patterns or correlations between the sensor values in the received data set and the overall behavior of the air in the facility (which act as parameters to the model) without pre-existing data labels or features and with a minimum of human supervision. The set of tuples in the dataset can be modified over time to reflect feedback from site/network administrators regarding whether the output(s) met safety and environmental health optimization targets and were sufficiently predictive or accurate, as well as the feedback regarding the practicality of the output(s) against the operation of the facility.

Machine-learning is applied to every air-quality sensor to build a model of correlation between the air at that point in the facility, the respective states of the various air-handlers (e.g., HVAC, MAU, baghouses, etc.), and/or the indoor average ambient conditions and outdoor ambient conditions. The environment modeling logic 175 works by taking in all of this information, looking across the entire facility, and determining optimal conditions for every HVAC, MAU, exhaust, baghouse, and other air handling components in order to adhere to the optimal air quality goals across the facility generally. The trained predictive model is stored in model storage 392 as predictive model 392-1.

Figure 4B:
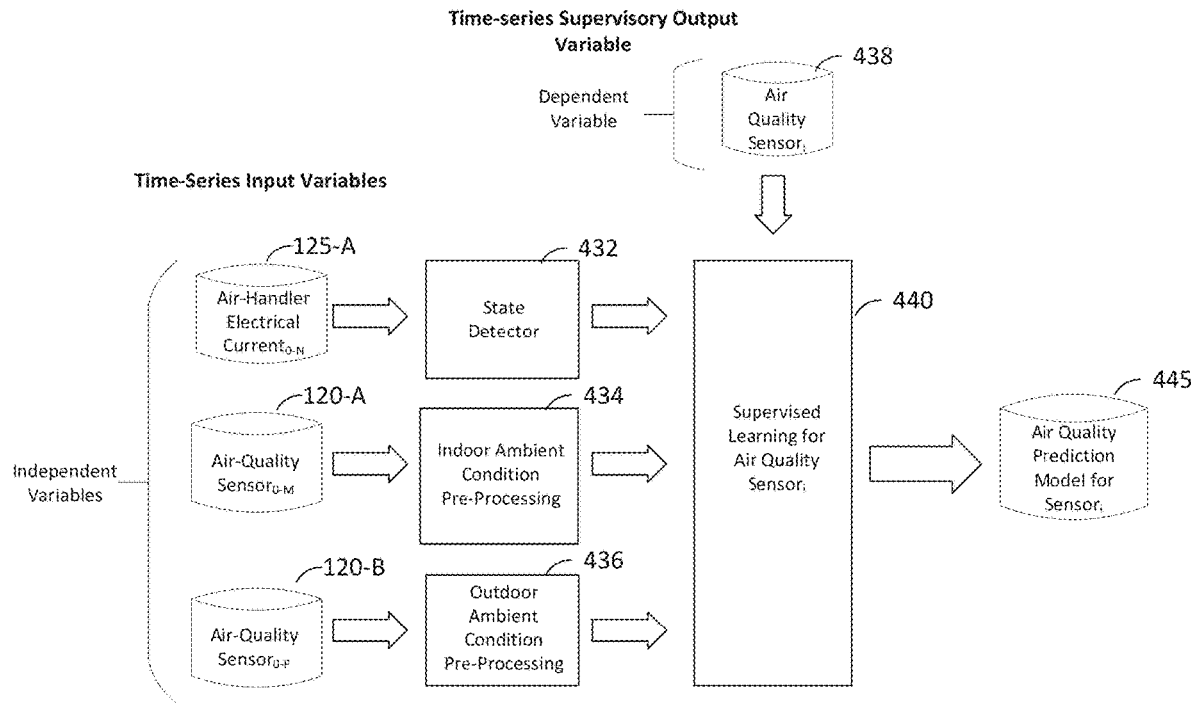
FIG. 4B is a block diagram of an exemplary process of generating air quality prediction models, in accordance with some embodiments of the disclosure.

FIG. 4B illustrates an exemplary data flow through environment modeling logic 175. Data from any of N air-handler electrical current sensors 125 and/or air quality sensors 120 (shown as air-handler electrical current$_{0-N}$ 125-A, air quality sensor$_{0-N}$ 120-A, and air quality sensor$_{0-N}$ 120-B) is taken together as input to a supervised learning module 440 for the air quality sensors. More specifically, data from any of N air-handler electrical current sensors 125 may be used by state detector module 432 to obtain information about the state of any of the nodes 225 on the network (e.g., their on/off state, their speed, their operating temperature, and the like). Data from any of M air quality sensors 120 located inside the facility may be used by indoor ambient condition pre-processing module 434, and data from any of the P air quality sensors 120 located outside the facility may be used by outdoor ambient condition pre-processing module 436. Modules 432, 434, and 436 process and conform the data from the respective inputs 125-A, 120-A, and 120-B for use by the supervised learning module 440. Data for a particular air quality sensor i (air quality sensor$_i$ 438) is taken into the supervised learning module as a dependent variable.

Supervised learning module 440 uses one or more learning algorithms to generate an air quality prediction model 445 for sensor$_i$. While the illustrated module is labelled as a supervised learning mechanism, any appropriate machine learning system can be used by the environment modeling logic 175 in different embodiments, such as supervised learning systems (e.g., regression trees, random forests), unsupervised learning systems (e.g., k-means clustering), support vector machines, kernel method, and Bayesian networks (probabilistic directed acyclic graphic model). In an exemplary embodiment, a Support Vector Regression (SVR) supervised learning algorithm with a polynomial (poly) kernel function is used to train the model against the set of training data. In other exemplary embodiments, other types of multiple regression analysis (e.g., SVR with the Radial Basis Function (RBF) kernel, linear kernel, or sigmoid kernel, or alternatively, simple regression, multiple regression, polynomial regression, linear regression) may be used.

The generation of the air quality prediction model involves the identification of one or more air quality prediction model parameters, each corresponding to the correlation between the air quality and the sensor data, and may include at least one of a weight or a bias against those parameters. In that regard, environment modeling logic 175 may train the prediction model by adjusting a weight (and, if necessary, a bias value) of the data from various air handling nodes (and other sources/types of data) to obtain a desired output for a given input. With reference to FIG. 4B, every relevant sensor value in the training data 125-A, 120-A, and 120-B can be multiplied by a corresponding weight (a dimensional constant) that captures its effect on the overall air quality of the facility (the weights being discretely assigned as any of a set of positive or negative values), and summed together to form an output. These assigned weight values may be consistently updated through the learning process as the model is trained and retrained. Further, the model may be trained using a method such as back propagation. The trained (or re-trained) air quality prediction model 445 is stored in model storage 392 (predictive model 392-1).

In an exemplary embodiment, the data used by environment modeling logic 175 to train model 392-1 may be routinely obtained or cached or stored (as training data 394) so as to be available offline (without network interaction) to environment modeling logic 175 such that environment modeling logic 175 can re-run the model on a periodic or set basis. The model is frequently updated as new data is collected in order to maintain the integrity of the model. This revision of the parameters is repeated iteratively with each subsequent data push from the sensors to the gateway 150, until the parameters of the model are highly accurate. In an exemplary embodiment, this re-running occurs every 15 minutes or on the push of new sensor data to the gateway 150, however other embodiments may differ so as to re-run the model, e.g., every minute, hourly, daily, weekly, monthly, upon request or according to a schedule, and/or on a real-time basis. It will be generally understood that re-running model 392-1 is resource dependent, and therefore the frequency of update may be based on the needs of the facility and available computing resources. With this model, the behavior of the facility under external forces and various air-handler states can be simulated.

In an alternate embodiment, the training of the model may be run (or re-run) only when instructed, such that a manual command or occurrence of an event may trigger a retraining. In one example, the control logic 350 may determine that sensor data 362 suggests that a desired or expected conditional threshold has been exceed (e.g., the temperature sensed by one or more sensors is abnormally high), and there has been an equipment failure or multiple failures, that an insufficient amount of training data exists relevant to the overall sensed conditions of the facility, or any appropriate trigger. In one embodiment, the retraining is conducted with a different set of target values in mind, for example, being more flexible on, or removing dependency of the model on, one or more desired outcomes (as one example, increasing the range of acceptable energy usage) thereby allowing a greater set of actions to be taken while still being within target air quality bounds. Put another way, the model may be retrained with certain default or best practices so as to be less aggressive on certain target conditions, in the case that the sensor data 362 suggests that certain predetermined scenarios (e.g., temperature or contaminant levels) have occurred or are being approached. These predetermined scenarios may be selected by a network or site administrator, and may in some instances rely on data-specific conditions. As just one example, if the historical amount of sensed data available is less than a predetermined amount (e.g., two weeks of data) the model may be programmed to meet more conservative conditions under the assumption that the system 100 does not have enough information to reliably predict outlier responses in less-known scenarios.

Figure 4C:
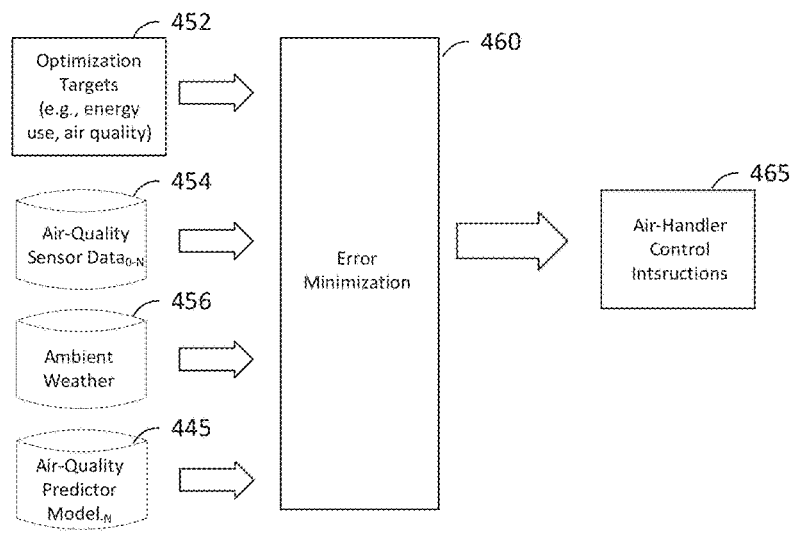
FIG. 4C is a block diagram of an exemplary process of generating air handling unit control instructions, in accordance with some embodiments of the disclosure.

Model 392-1 is applied in an attempt to optimize for an objective function 452 defined by a desired air handling outcome. More specifically, in step 410 (FIG. 4A), the prediction model 392-1 (having been trained on historical data) is now run using the most current (that is, subsequently received) sensed data (including, e.g., air quality sensor data 454 and/or ambient weather data 456), applying error minimization based on the previously-set desired outcomes for air in the facility. FIG. 4C illustrates this process where, once the behavior of the air in the facility can be simulated, error minimization (module 460) is applied over the trained model 445 (in step 412) to generate optimal air-handling control instructions (465) that work within the tolerances of defined optimization targets 452, such as energy usage, particulate concentration, temperature, humidity, and pressure at every point in the facility, those targets being identified in step 408. The output of the model 445 are air-handler control instructions 465, which instructions are then sent by the gateway 150 to the appropriate air-handling and distribution units via the mesh network 220. That is, the model 445 is able to set conditions (e.g., a schedule or activity instructions) for all or a subset of the nodes 225 in a facility to act the next X hours in order to reach an optimal result for the facility as a whole.

Figure 5A:
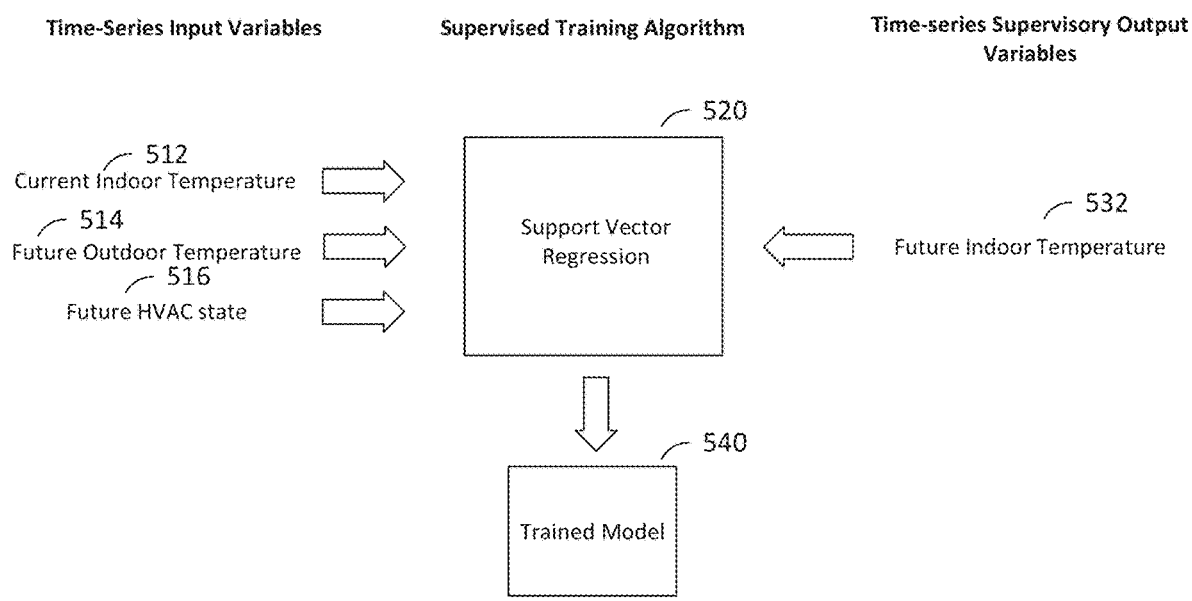
FIG. 5A is a block diagram of an exemplary process of training an air quality prediction model to optimize for temperature, in accordance with some embodiments of the disclosure.
Figure 5B:
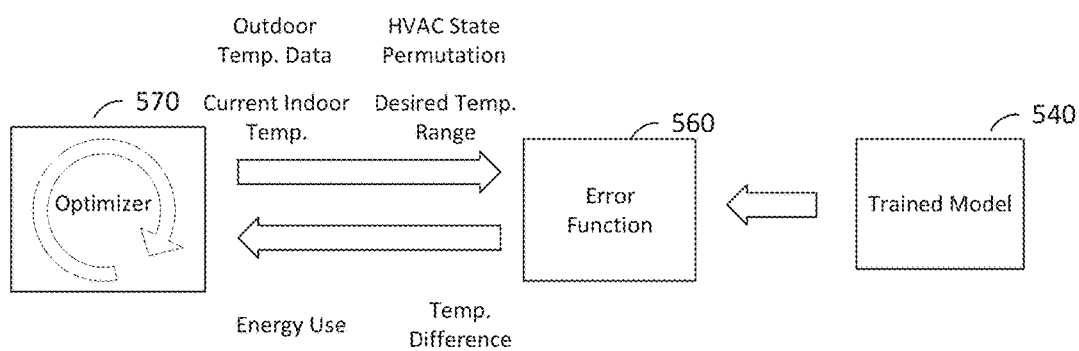
FIG. 5B is a block diagram of an exemplary process of applying an air quality prediction model to optimize for temperature, in accordance with some embodiments of the disclosure.

With reference to FIG. 5A, as just one example, the training data set of a learning algorithm may include current (real-time) sensor data comprising an HVAC state (from air-handler electrical current sensor$_1$ data 125-A) 516, indoor temperature values (from air-quality sensor$_1$ data 120-A) 512, and a predicted (from a third-party server) future outdoor temperature 514 (e.g., weather data) one hour in advance. In addition, historical data using a one-hour window sliding 15 minutes at a time is used to provide enough data to train the predictive model. A desired outcome (supervisory variable) 532 of the generated model is the predicted future indoor temperature one hour in the future. A support vector regression learning algorithm with a polynomial kernel is applied and produces, e.g., a variance score of 0.92. A trained air quality prediction model 540 is generated, and error minimization is applied over that trained model in FIG. 5B. FIG. 5B illustrates the generation of an indoor temperature by the trained model 540 over a range of HVAC units running and outdoor temperature. In general, the purpose of an error minimization is to find the combination of inputs to a function that produces the least discrepancy from the desired optimization targets. With reference to FIG. 5A, an exemplary scenario may exist where the set of variables the site administrator wants to optimize for are energy use and temperature difference from a setpoint. The environment modeling logic 175 (or similar machine learning logic at the gateway 150, in other embodiments) obtains as inputs to the trained air quality prediction model 445 an HVAC state 516, an outdoor temperature 514, and a current indoor temperature 512, and attempts to predict the future indoor temperature 532 one hour in advance. The optimizer 570 and error function 560 apply an optimization routine that varies the HVAC state over a sliding window of 6 hours (that is, minimizing error over a varying number of hours into the future) to produce a set of instructions that, if applied, would result in the least HVAC use and least error from the desired indoor temperature range. Of course, the foregoing is merely exemplary and other embodiments may use different input data sources and values, different optimization goals, and the like.

In some embodiments, step 412 (FIG. 4A) may be performed at the server 170 or another remote computing resource. In other embodiments, step 412 may be performed at the gateway 150 itself, where server 170 transmits the trained model to the gateway 150, where it is stored in memory 340 in model storage 368. In such an embodiment, performance at the gateway 150 is not dependent on the availability of other WAN networks (such as the Internet) so that even if an internet connection drops, the last-trained model 445 can be applied to each set of generated sensor values to generate control decisions at the same relative frequency that new sensor data is collected, even where a new or updated model is not generated or received. That is, the processing of the error minimization function 460 may in some embodiments be performed at the gateway regardless of whether the gateway is "online" or "offline" (with respect to network connectivity) or a combination of the two. Such an implementation may be particularly well suited to facilities where network connection (outside of the local mesh network 220) may be unreliable or unavailable.

In the exemplary embodiment, the output of step 412 is a plurality of instructions to be respectively applied to one or more networked nodes 225. In one embodiment, the instructions may include a set of tuples, or pairs, matching each node 225 with an instruction of varying complexity, and the gateway may transmit to each identified node its associated instruction. The transmissions to the relevant nodes 225 (that is, the air handling units that could function to change the air quality conditions of the facility) are performed over the mesh network of devices 220. To this end and as shown in FIGS. 2B and 2C, pre-existing networked devices (such as lighting nodes) may be used to facilitate transmission of air handling instructions over the mesh network, simplifying and increasing the reliability of the networked communication.

The generated and transmitted instructions may be as simple as an instruction to turn on/off the unit and/or an value to which the unit should adjust its set operation (e.g., a temperature setpoint, speed of rotation or activity, and so on). Additionally or alternately, the instruction may be a schedule or timing for the node's activity (e.g., the instructions may be a schedule for when an HVAC, MAU, baghouse, exhaust, etc. should come online/offline, whether based on an internal clock or a countdown/periodicity), or a rate or speed of its functionality. In some embodiments, the instructions may apply to a node 225 a broader, narrower, or otherwise different range of acceptable values in a range of tolerance (e.g., for a thermometer, a different min/max temperature range). In still other embodiments, the instructions may not set out specific values to be reached by a node 225 (e.g., a set temperature value) but may instead include information indicating that the node should apply a set of instructions stored at the node 225 itself, for example to switch to and/or function in a certain preset mode or state.

The generated instructions apply, in the exemplary embodiment, to the entire set of networked devices 225 managed by the gateway 150 (or alternately, a subset of devices in a particular physical area, networked or organizational group, or the like). Where instructions are sent for each of the respective devices 225, the instructions may indicate that a given node should continue to function in an unchanged or routine or normal manner. Upon each application of the trained algorithm, e.g., every 15 minutes or so or on a rolling or iterative basis, a new set of instructions are generated and transmitted to the devices within the facility. By these instructions, the single holistic machine learning algorithm applied at the server 170 (or at the gateway 150) functions to generate a plurality of optimized individual schedules of each device to function in support of the air quality of the facility as a whole.

In step 416, the gateway 150, and specifically, scheduling logic 352, uses the generated instructions to control the components of the air handling system. In an exemplary embodiment, the gateway 150 obtains data from one or more electric current sensors 125 on a node 225 to detect when a node is on/off and when the power is up (and the degree to which the node is operating). Based on this information, scheduling logic 352 may function to determine whether to enable, disable, or alter the operating status of a node to meet the conditions of the generated instructions. For instance, where a node 225 is a fan, scheduling logic 352 may provide instructions to drive the fan with analog signals to instruct a speed of action; that is, to enable or disable or ramp up/down the speed of the fan where there is a variable power supply. In the case where node 225 is an HVAC unit, which units typically run based on the measurement of a thermostat, the scheduling logic 352 may provide to the HVAC an electrical signal (e.g., a 24 volt AC signal) instructing the unit whether to turn on/off, or when to turn components (e.g., stage compressors) on/off. If no instructions are received (e.g., if the transmission if lost or delayed), a node 225 may continue activity in its current manner (or according to its preset schedules) until otherwise instructed.

The exemplary systems can be applied to existing hardware, and are not limited to new installations of air handling devices or networks. One or more existing air handling units 225 may be retrofit with electric current sensors 125, such that no special compatibility or configuration of the nodes 225 is necessary. This may be the case even where an air handling unit, lighting system, or other node 225 is not configured for, or is other otherwise unable to, communicate with gateway 150 on its own to transmit sensor readings and receive instructions. For instance, the systems described herein interface with an existing thermostat to read data from the sensor (e.g., thermostat temperature data, humidity data, or the like) and transmit that data to the gateway 150 and ultimately to the cloud (server 170). In an exemplary embodiment, the scheduling logic 352 may interface the gateway with the node 225 via a relay to provide instructions to the node. In another embodiment, the logic 352 may interface with a BACnet interface (e.g., of a thermostat) or another type of standard serial interface through which commands may be introduced to the device. By these means, standard (predefined) commands can be used that the device is already configured to process and intercept. In still another embodiment, a separate unit facilitating wireless control of a node may be attached to the node. This may be, in one embodiment, a snap-on device with a dedicated set of circuitry to facilitate the translation of control instructions from the gateway 150 to the electrical components of the specific device at node 225 (e.g., sensor, HVAC, baghouse, exhaust, MAU, lighting system, and so on). Alternately, the dedicated circuitry may be integral within the node 225 (e.g., built into the thermostat, or other control circuitry).

In some embodiments, where instructions that meet air quality values within the optimization targets cannot be generated (e.g., the targets are too strict or the air quality is sufficiently far from those targets due to unusual circumstances), the module 460 may additionally or alternately output an error or notification to the facility manager, site administrator, or a designated third party, e.g., via text, SMS, email, light or sound alert on a device such as a cellular phone or PDA, voice or data message, light or sound notification within the facility (such as a warning light or siren), or the like. This notification system may be, in some embodiments, integrated with an existing emergency system so as to meet industry-standard safety notification and alert requirements.

In addition to sensor data and aggregated sensor data, some embodiments of the environment modeling logic 175 may calculate and take into consideration gradients of environmental factors through the facility 110 or a portion of the facility 110, and the effect of those gradients on the modeled air. In a real-world implementation, a sensor reading at a particular sensor reflects an air quality condition that is not necessarily localized to the area immediately around that sensor. The flow of air through the facility may, for example, disperse and spread contaminants introduced into the air at a first location through a facility. Therefore, a single sensor reading at a first location may imply a change in air quality at different locations in the facility. Tracking the flow of contaminants within a facility is a highly relevant factor for consideration by an air quality predictive model. What is more, a sensor reading at a particular sensor may reflect a condition that is ephemeral and likely to increase or decrease relatively quickly. Therefore, a rate of change in measured value may also be particularly relevant to a predicted condition of the air.

To facilitate this tracking, environment modeling logic 175 (or logic at the gateway 150) may measure and store information indicative of temperature gradients, humidity gradients, pressure gradients, contaminant concentration gradients, and/or other relevant quantities that describe how air conditions change at a particular point and/or through different points in the facility. A temperature gradient value for example (measured in K/m, degrees/m, etc.) may reflect the direction and rate at which temperature may change the most rapidly at different points in the facility, impacted for instance by relative location of the measurement in the three dimensional space (e.g., higher or lower), proximity to doors or windows, proximity to machinery, equipment, or other heat sources, and so on. In the exemplary embodiment, a temperature, or other, gradient from sensor to sensor may be determined. That is, a calculation of a change or delta that is informed based on the measured readings at two or more sensors at known respective locations (such that a distance and direction between the sensors can be obtained) as compared to two discrete sensor readings at two discrete locations. Similarly, a rate and direction of change in air condition at a single location (of e.g., temperature, pressure, contaminants, etc.) may be considered a gradient to be determined from a sensor's readings over time.

The measurement of different gradients can inform a stratification, or grouping or assignment, of the facility into different behavioral sets. Stratification of the facility allows for a more comprehensive view of behavior of the facility, without assumptions of consistency or homogeneity of air flow or environmental response. To illustrate, facility 110 (FIG. 1) is a 3-dimensional space. At different z-axis points in the facility, the air pressure may vary. Similarly, various areas of horizontal space, or angled or irregular space, may exist where the same type of measurement may vary in value at different locations. This variance is not in discrete, leveled layers of given heights, but rather, the air pressure may increase or decrease (whether regularly or irregularly) along a relative function of the z-axis value. A given gradient of an environmental conditions such as air pressure, temperature, humidity, contaminant level, and so on, may impact the flow of air, and therefore, an airborne contaminant, as will the type and introduction point of the condition.

The calculation of the relevant gradient values may be performed by the environment modeling logic 175 or in some embodiments, by control logic 350 (or exception handling logic 354) at the gateway 150, in a data gathering stage. In one embodiment, the gateway 150 may (in step 406 of FIG. 4) calculate at least gradient such as a temperature gradient, a contaminant level gradient, and/or an air pressure gradient based on received sensor measurements. An unexpected gradient (e.g., a high rate of change) may trigger exception handling actions (step 420). In one embodiment, the gateway 150 may send the calculated gradient(s) (or the data from which calculation of gradient can be performed) to the server 170, where logic 175 may use such data to model air flow. For instance, logic 175 may perform thermal stratification, air pressure stratification, and/or any other type of grouping or classification of various physical locations or ranges within the facility 110. These calculations, and/or the modeled flow of air, may be weighted and applied in the execution of the generated air quality prediction model in the manner described above with reference to FIGS. 3A-5B.

In an embodiment, the server 170 or the gateway 150 may contain hardware and/or software programmed to calculate the rates of change in temperature, air pressure, humidity, and/or concentration of contaminants across a physical space, such as a room, a building with multiple rooms, a horizontal or vertical area, or the like. These rates of change may occur at a single point (multiple measurements at one sensor at different times) or between multiple sensors at different locations in the space (whether at a single timestamp or over multiple points in time). These rates of changes are gradients used to predict how the air in a facility will behave in the near future. By these means, calculated rates of change, directions or flows of change, and other computed gradient values can be derived from sensed values of temperature, pressure, humidity, and contaminant concentration, and such calculations may be used in a predictive analysis to model the flow of air and/or particulates within the facility.

As an example, the pressure measured by sensors throughout a facility may be used to determine pressure gradients, and this information can be used to predict how air and, thus, contaminants will flow through the facility. In this regard, after the containment levels throughout the facility have been determined based on measurements from the sensors, the server 170 or the gateway 150 may use pressure gradient information to predict how these contaminant levels will change (e.g., how the contaminants will flow through the facility) in the future. For example, using the current sensor readings and the pressure gradient calculations, the server 170 or the gateway 150 may model the flow of contaminants and then evaluate such model to predict when the contaminant levels in a certain area will exceed a desired concentration if corrective action is not taken. In response to a prediction that a desired concentration level will be exceeded or other undesired condition will occur, the server 170 or gateway may take corrective action, such as activation of one or more fans or other types of air handling equipment or a change to one or more setpoints, in an attempt to avoid or otherwise mitigate the predicted condition. Similar techniques may be used to control other types of conditions or parameters in a proactive manner. As an example, temperature gradients may be used to predict how temperatures within the facility will change in the future, and an action may be taken to proactively control temperature, such as activation of one or more fans or other types of air handling equipment or a change to one or more setpoints, to avoid or mitigate an undesired temperature condition.

In some cases, calculated gradients may be used to sense certain conditions for which a corrective action is desired. As an example, if the gradient between two temperatures, such as a temperature measured by a sensor at a lower altitude and temperature measured by a sensor at a high altitude in the same room or area of the facility exceeds a threshold, a particular action may be taken, such as activation of a fan or other air handling equipment or a change to one or more setpoints. The action taken may be selected to reduce or other change the measured gradient. Similarly, an action may be taken to reduce or otherwise change a measured pressure gradient between the pressures measured by different sensors in different areas of the facility or between a pressure measured inside of the facility and atmospheric pressure measured outside of the facility.

The calculations of gradients (e.g. a rate of change) may be performed at the server 170 or the gateway 150. In a case where the calculations are performed at the gateway 150, the gateway 150 may comprise, in the memory 340, a cache storing sensor readings over a relatively small period of time (e.g., the most recent minutes, hours, or days), to be used in rate of change calculations. In some embodiments, sensor data in this cache beyond a certain "age" may be overwritten with newer sensor data so as to avoid unneeded storage of older data not relevant to the gradient analysis (such older data being stored in the time-series database 160). Where the calculations are performed at the server 170, recent sensor data may be obtained from the time-series database 160 and/or the gateway 150.

The calculated gradient information, including changes in any of temperature, pressure, and so on, is transmitted to the logic 175 to be used as an input to the predictive model both when the model is being trained and when the trained model is applied to real-time sensor data. In some embodiments, where the execution of the machine learning analysis with the trained model is performed at the gateway 150, no networked transmission of the gradient data is needed.

Conventional systems focus control of an air handling system on the comfort of the human occupants of the physical space. Further, conventional industrial applications environmental systems fail to consider sensed environmental data both individually and holistically. That is, sensors (e.g., thermometers) controlling an HVAC unit are limited to the universe of data collected by the individual sensor and the application of, e.g., empirical formulas thereto. Even if the actions of another HVAC unit would influence the environmental health and safety of the area around neighboring sensors, the air handling systems in conventional applications are incapable of coordinating knowledge and action between the sensors and attached air handling or distribution units.

The systems and methods described above allow for automated intelligent control of multiple individually-controlled air handling units in support of overall environmental health and safety while optimizing for the goals of the site administrator. More specifically, the systems and methods described herein apply machine learning to learn how the facility as a whole behaves as a cohesive unit. Further, the described machine learning algorithms that optimize for any of several different goals, a facility-specific and industry-specific set of rules can be sustained. Because of this, air handling systems that use a computer system employing the solutions described herein perform more efficiently, faster (with reduced execution time) and with less wasted computing resources, and in safer and more sustainable, energy-efficient manners. Accordingly, the uptime of the both the computing systems and the overall machine systems within the facility is improved.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A method for modeling the behavior and condition of air in a structure, the method comprising:
   receiving a first environmental measurement from a first sensor and a second environmental measurement from a second sensor, wherein the first sensor and the second sensor are fixedly positioned within the structure;
   generating a predictive model for air quality within the structure based on (i) a dataset comprising the first environmental measurement, the second environmental measurement, and a plurality of states for each of a plurality of air handling units for the structure and (ii) one or more environmental health and safety standards, wherein the generating includes:
   (a) determining, based on the dataset, a plurality of parameters that reflect a condition of air in the structure; and
   (b) applying a plurality of weighted values to the plurality of parameters, respectively, the weighted values being obtained through the application of one or more supervised learning algorithms;
   applying error minimization over the predictive model to adhere to a desired air quality optimization target within a certain time period;
   generating, through the predictive model, a plurality of air-handling control instructions for respectively controlling the operation of each of the plurality of air handling units; and
   transmitting, to each of the plurality of air handling units, at least a respective one of the generated air-handling control instructions.

2. The method of claim 1, wherein the one or more supervised learning algorithms comprise a support vector regression model.

3. The method of claim 1, wherein the first environmental measurement relates to one or more of: temperature, air pressure, humidity, contaminant level, volatile organic compounds, carbon monoxide, particulates, and energy usage.

4. The method of claim 1, wherein an electric current sensor is coupled to one of the plurality of air handling units, and
   wherein a measurement by the electric current sensor reflects a state of the one of the plurality of air handling units.

5. The method of claim 1, further comprising:
   receiving a third environmental measurement from a third sensor positioned on the exterior of the structure.

6. The method of claim 1, wherein the dataset further comprises weather forecast data regarding a geographic location at which the structure is located.

7. The method of claim 1, wherein the dataset further comprises at least one measurement of air contaminant flow within the structure; and
   wherein the measurement of air contaminant flow is calculated based on a delta change in an air quality measurement between the first environmental measurement and the second environmental measurement, a distance between the first sensor and the second sensor, and a relative position between the first sensor and the second sensor.

8. The method of claim 1, wherein the dataset further comprises at least one measurement of air contaminant flow within the structure; and
   wherein the measurement of air contaminant flow is calculated based on an air quality gradient.

9. The method of claim 1, wherein the first environmental measurement is at least one of a temperature gradient, an air pressure gradient, or a contaminant concentration gradient, and
   wherein the first environmental measurement is determined by calculating a rate of change between (a) measured readings at two or more sensors at known respective locations or (b) measured readings at a single sensor at two or more points in time.

10. The method of claim 1, wherein the first environmental measurement is a contaminant concentration,
wherein the generating, through the predictive model, of the plurality of air-handling control instructions comprises modeling an air contaminant flow within the structure, and
wherein the first environmental measurement is used as input to the predictive model in modeling the air contaminant flow.

11. The method of claim 1, further comprising calculating a gradient between the first environmental measurement and the second environmental measurement, wherein the predictive model is based on the calculated gradient.

12. The method of claim 1, wherein the plurality of air handling units includes at least one heating, ventilation and air conditioning (HVAC) unit, at least one make-up air unit (MAU), at least one baghouse, and at least one fan.

13. The method of claim 12, wherein the at least one fan includes an exhaust fan and a de-stratification fan.

14. The method of claim 1, wherein the first environmental measurement is at least one of a temperature gradient, an air pressure gradient, or a contaminant concentration gradient, and
wherein the first environmental measurement is determined by calculating a rate of change between measured readings at two or more sensors at known respective locations.

15. An air handling system comprising:
an air handling control unit having at least one processor;
one or more sensors positioned within an indoor facility and communicatively coupled to the air handling control unit via a network, each of the one or more sensors being configured to sense an environmental measurement directed to air quality or a state of an air handling unit of a plurality of air handling units, and to transmit the sensed environmental measurement or the state to the air handling control unit, the frequency of periodic transmission being based on a predetermined interval of time;
the plurality of air handling units communicatively coupled to the air handling control unit via the network, each of the plurality of air handling units comprising a communication interface permitting communication on the network and at least one control interface for controlling the air handling unit;
a server communicatively coupled to the air handling control unit;
wherein the air handling control unit is programmed with instructions that, when executed by the at least one processor, cause the at least one processor to communicate over the network and store, in a database, in association with a time of sensing, sensed environmental measurements received from the one or more sensors;
wherein the server is configured to:
(1) generate a training dataset in accordance with environmental measurements and states of the plurality of air handling units obtained from a database and one or more environmental health and safety standards;
(2) train an air quality prediction model based on the training dataset through the application of one or more supervised learning algorithms;
(3) transmit, to the air handling control unit, the trained air quality prediction model; and
(4) repeat steps (1)-(3) in an iterative manner in accordance with the predetermined interval of time; and wherein the instructions, when executed by the at least one processor, cause the at least one processor to:
(a) receive one or more subsequent sensed environmental measurements from the one or more sensors;
(b) apply the trained air quality prediction model to the one or more subsequent sensed environmental measurements to obtain a predicted air quality condition of the indoor facility;
(c) generate air handling control instructions for a respective each of the control interfaces of the plurality of air handling units in accordance with the predicted air quality condition of the indoor facility; and
(d) transmit, to the communication interface of each of the plurality of air handling units, respective air handling control instructions.

16. The air handling system of claim 15, wherein an environmental measurement relates to one or more of: temperature, air pressure, humidity, contaminant level, volatile organic compounds, carbon monoxide, particulates, and energy usage.

17. The air handling system of claim 15, wherein the one or more sensors comprise an electric current sensor coupled to one of the plurality of air handling units, and
wherein a measurement by the electric current sensor reflects a state of the one of the plurality of air handling units.

18. The air handling system of claim 15, wherein the dataset is further generated in accordance with weather forecast data regarding a geographic location at which the facility is located.

19. The air handling system of claim 15, wherein the dataset is further generated in accordance with at least one measurement of air contaminant flow within the structure; and
wherein the measurement of air contaminant flow is calculated based on a delta change in an air quality measurement between environmental measurements of two of the one or more sensors, a distance between the two of the one or more sensors, and a relative position between the two of the one or more sensors.

20. The air handling system of claim 15, wherein the dataset is further generated in accordance with at least one measurement of air contaminant flow within the structure; and
wherein the measurement of air contaminant flow is calculated based on an air quality gradient.

21. The air handling system of claim 15, wherein the instructions, when executed by the at least one processor, cause the at least one processor to determine, based on the one or more subsequent sensed environmental measurements, an air quality gradient, the air quality gradient being at least one of a temperature gradient, an air pressure gradient, or a contaminant concentration, and
wherein the air quality gradient is determined by calculating a rate of change between (a) measured readings at two or more sensors at known respective locations or (b) measured readings at a single sensor at two or more points in time.

22. The method of claim 21, wherein the trained air quality prediction model is applied to both (a) the one or more subsequent sensed environmental measurements and (b) the calculated air quality gradient to model an air contaminant flow within the indoor facility.

23. The system of claim 15, wherein the server is configured to detect an exception based on the one or more environmental measurements and transmit, to the communication interface of at least one of the plurality of air handling units, one or more instructions for instructing the at least one of the plurality of air handling units to perform a predefined action.

24. The system of claim 15, wherein the plurality of air handling units includes at least one heating, ventilation and air conditioning (HVAC) unit, at least one make-up air unit (MAU), at least one baghouse, and at least one fan.

25. A system for modeling the behavior and condition of air in a structure, the system comprising:
 a plurality of nodes, each node comprising (a) a communication interface permitting communication on a first network and (b) one or more sensors, each of the one or more sensors being respectively configured to take an environmental measurement or a state measurement of an industrial air handling device of a plurality of industrial air handling devices, wherein the environmental measurement is directed to one or more of: temperature, air pressure, humidity, contaminant level, volatile organic compounds, carbon monoxide, particulates, and energy usage;
 a management device communicatively coupled to the first network, the management device having at least one processor programmed with instructions that, when executed by the at least one processor, cause the at least one processor to:
  receive a first environmental measurement from a first node of the plurality of nodes and a second environmental measurement of a second node of the plurality of nodes;
  obtain a predictive model for air quality within the structure, the predictive model having been trained in accordance with a dataset comprising historical environmental measurements from both of the first node and the second node and state measurements for the plurality of industrial handling devices;
  apply error minimization over the predictive model to adhere to a desired air quality optimization target within a certain time period;
  generate a plurality of air-handling control instructions for respectively controlling the plurality of industrial air handling devices; and
  transmit, to each of the plurality of industrial air handling devices, a respective set of the generated air-handling control instructions.

26. The system of claim 25, wherein the plurality of air handling units includes at least one heating, ventilation and air conditioning (HVAC) unit, at least one make-up air unit (MAU), at least one baghouse, and at least one fan.

* * * * *